Figure 1:
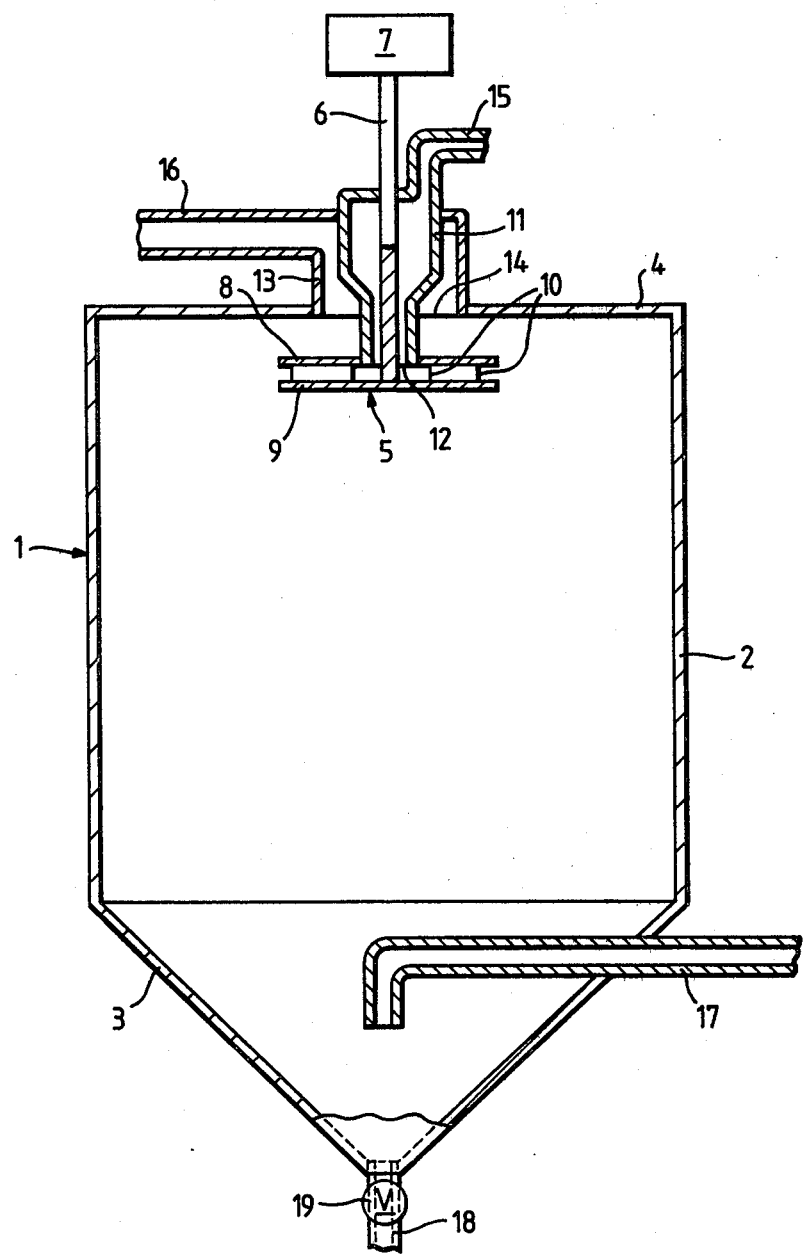

United States Patent [19]

Kelland

[11] Patent Number: 4,465,785

[45] Date of Patent: Aug. 14, 1984

[54] COMPOSITION PRODUCTION AND USE

[75] Inventor: John W. Kelland, Bedfordshire, England

[73] Assignee: Imperial Chemical Industries PLC, London, England

[21] Appl. No.: 444,364

[22] Filed: Nov. 26, 1982

[30] Foreign Application Priority Data

Dec. 17, 1981 [GB] United Kingdom ............... 8138051
Jul. 16, 1982 [GB] United Kingdom ............... 8220694

[51] Int. Cl.$^3$ .............................................. C08F 4/64
[52] U.S. Cl. ..................................... 502/105; 502/104; 502/119; 502/127; 502/128; 526/125
[58] Field of Search ................... 252/429 B; 502/105, 502/104, 119, 128, 127

[56] References Cited

U.S. PATENT DOCUMENTS

| 3,094,568 | 6/1963 | Hay et al. | 252/429 B X |
| 4,115,319 | 9/1978 | Scata et al. | 252/429 B |
| 4,240,929 | 12/1980 | Dietz et al. | 252/429 B |
| 4,252,670 | 2/1981 | Caunt et al. | 252/429 B |
| 4,301,029 | 11/1981 | Caunt et al. | 252/429 B |
| 4,329,252 | 5/1982 | Gavens et al. | 252/429 B |
| 4,350,612 | 9/1982 | Greco et al. | 252/429 B X |
| 4,376,062 | 3/1983 | Hamer et al. | 252/429 B |
| 4,425,258 | 1/1984 | Tanaka | 502/125 X |

FOREIGN PATENT DOCUMENTS

| 0004791 | 10/1979 | European Pat. Off. |
| 0022675 | 1/1981 | European Pat. Off. |
| 1180416 | 12/1958 | France. |
| 1471472 | 1/1967 | France. |
| 56-149404 | 11/1981 | Japan. |
| 1321766 | 6/1973 | United Kingdom. |
| 1536064 | 12/1978 | United Kingdom. |
| 2018788 | 10/1979 | United Kingdom. |
| 2033409 | 5/1980 | United Kingdom. |
| 2103626A | 2/1983 | United Kingdom. |

OTHER PUBLICATIONS

Patent Abstracts of Japan, vol. 6, No. 31, 2/24/82, p. 909 C-92.
Central Patents Index Abstract Reference 78771 D.

Primary Examiner—Patrick Garvin
Attorney, Agent, or Firm—Cushman, Darby & Cushman

[57] ABSTRACT

A titanium containing composition is obtained by contacting a magnesium halide with a non-metallic halide such as thionyl chloride, for example by grinding, and contacting the product with a titanium tetrachloride-containing material, preferably undiluted liquid titanium tetrachloride. The treatment with titanium tetrachloride may be effected by milling or by suspending the solid in the titanium tetrachloride. The solid product can be washed at least once. An ester is preferably contacted with the magnesium halide. The product obtained may be used with an organic metal compound such as aluminum triethyl and preferably a Lewis Base such as ethyl benzoate or an organic silicon compound to give olefin polymerization catalyst. When used to polymerise propylene the product obtained is highly stereoregular and the level of residual catalyst is low.

11 Claims, 2 Drawing Figures

COMPOSITION PRODUCTION AND USE

The present invention relates to the production of a composition which includes a transition metal, catalyst systems containing such compositions and the use of such catalyst systems to polymerise unsaturated monomers, particularly olefin monomers such as ethylene and propylene.

In recent years, considerable effort has been directed to the production of polymerisation catalysts which are highly active whereby there is no need to remove catalyst residues from the polymer at the end of the polymerisation. For the polymerisation of propylene and the higher olefin monomers it is also necessary that the catalyst system should be stereospecific. Considerable effort has been directed to producing catalysts which combine high activity with good stereospecificity and catalysts have been developed which are capable of giving high yields of propylene polymers which are more than 90% insoluble in boiling heptane. Furthermore, the improvements in the catalyst system have made it possible to modify the polymerisation technique used. In particular, the polymerisation technique may be simplified to avoid the steps of post-treating the polymer product, which post-treatment has been necessary hitherto. To simplify the process even further, processes are now being used in which the polymerisation is carried out in the absence of any substantial quantity of inert hydrocarbon liquids in contrast to many prior art processes in which inert hydrocarbon liquids are used as the suspension medium for the polymerisation process. In one technique, which avoids the use of any substantial quantity of inert hydrocarbon liquids, polymerisation is effected by using the monomer in the gaseous state and by contacting this gaseous monomer with growing polymer particles which contain active polymerisation catalyst. Using such a technique, the whole polymer product is recovered without separating any atactic polymer which may be formed. Hence, for use in such a process, it is necessary that the catalyst system should be particularly stereospecific. Whilst catalyst systems disclosed in the art, for example in British patent specification Nos. 1,540,323 and 1,559,194, have high activity and good stereospecificity, we have found that these systems are not sufficiently stereospecific to give an entirely acceptable propylene polymer product when used in a gas phase propylene polymerisation process. Surprisingly however, we have found that by a modification of the processes of the prior art, the stereospecificity of the catalyst system produced is improved and the catalyst is then suitable for use in the gas phase polymerisation process to give propylene polymer products having useful properties.

According to the present invention there is provided a process for the production of a titanium containing composition which process comprises contacting a magnesium halide with at least one compound of the formula $$AO_aX_{(b-2a)}$$

and contacting the product obtained with titanium tetrachloride or a titanium tetrachloride-containing material, wherein A is a carbon or sulphur atom;
X is a halogen atom;
a has a value of 1 or 2 and 2a has a value which is less than the valency of A; and
b is equal to the valency of A.

The magnesium halide material is also very preferably contacted with a Lewis Base compound, particularly an ester, especially a mono- or poly-ester of a saturated or unsaturated polycarboxylic acid (which term is used to include dicarboxylic acids) or an ester of the formula $$R^1COOR^2$$

wherein
$R^1$ is a hydrocarbon radical which may be substituted with one or more halogen atoms and/or oxyhydrocarbon groups; and
$R^2$ is a hydrocarbon radical which may be substituted by one or more halogen atoms.

The contacting with the Lewis Base compound is preferably effected before the contacting with titanium tetrachloride or the titanium tetrachloride-containing material. For convenience "titanium tetrachloride" will be used hereafter to include the titanium tetrachloride-containing material. It is convenient to effect the contacting with the Lewis Base compound simultaneously with the step of contacting with the at least one compound of the formula $$AO_aX_{(b-2a)}$$

The contacting with titanium tetrachloride may be effected in more than one stage, for example, in two stages, but it is preferred to effect this contacting in only one stage.

After contacting with titanium tetrachloride, the product obtained, which is a solid, is preferably separated from any excess quantity of any liquid phase which is present and the product may be washed to remove soluble titanium-containing species, including adsorbed titanium tetrachloride, from the separated solid. However, in contrast to previous processes, we have found that it is not necessary to effect the washing of the solid product to remove all of the soluble titanium-containing species from the solid product. More specially, we have obtained satisfactory products wherein at least 25% by weight, and in some cases in excess of 50% by weight, of the titanium-containing species which are present in the solid product are capable of being removed by continued washing with a hot hydrocarbon or halohydrocarbon liquid such as for example, heptane, chlorobenzene or 1,2-dichloroethane.

For convenience hereafter the compound of the formula $$AO_aX_{(b-2a)}$$

will be referred to as the "non-metallic halide". The element A is preferably sulphur. The value of a in the non-metallic halide is preferably one. The halogen atom X is conveniently chlorine. We have obtained particularly useful results using thionyl chloride (SOCl$_2$) as the non-metallic halide.

The non-metallic halide is conveniently used in an amount of at least 1% up to 50% by weight relative to the magnesium halide, particularly in an amount of at least 2% up to 25% by weight relative to the magnesium halide and especially in an amount of at least 2% up to 15% by weight relative to the magnesium halide. It is preferred that the magnesium halide is essentially anhydrous magnesium chloride, typically having a water content of not more than 2% by weight. The contacting of the magnesium halide with the non-metallic halide can be effected at a temperature which does not exceed 100° C. and which especially does not exceed 60° C.

The magnesium halide is preferably contacted with an ester, for example one of the defined formula in which the groups $R^1$ and $R^2$ are the same or different, and preferably an ester in which one, but not both, of the groups $R^1$ and $R^2$ includes an aryl group. The group $R^1$ is conveniently an optionally substituted alkyl or aryl group, for example, a methyl, ethyl, or especially a phenyl, a tolyl, a methoxyphenyl, a fluorophenyl or a benzyl group. The group $R^2$ is preferably an alkyl group containing up to 6 carbon atoms, for example, a methyl, ethyl or butyl group. It is particularly preferred that $R^1$ is, or contains, an aryl group and that $R^2$ is an alkyl group. Examples of esters of the formula $R^1COOR^2$ include methyl benzoate, methyl 4-methylbenzoate and ethyl benzoate. Esters of polycarboxylic acids which may be used include diethyl phthalate, di-isobutyl phthalate, di-isobutyl maleate and diethyl-2,3-naphthalene-dicarboxylate. The Lewis Base compound is conveniently used in an amount of up to 5 moles for each mole of the magnesium halide and may be used in an amount of for example, up to 2, and especially from 0.02 up to 1, particularly 0.02 up to 0.4, moles of ester for each mole of magnesium halide.

The magnesium halide may be contacted with the non-metallic halide, and with the optional Lewis Base compound, using any suitable contacting technique. A convenient technique for effecting the contacting is by grinding together the magnesium halide and a suitable proportion of the non-metallic halide and the optional Lewis Base compound.

The grinding may be carried out in any suitable grinding apparatus such as, for example, a rotating ball mill or a vibrating ball mill. The grinding is very preferably carried out in the substantial absence of oxygen or moisture.

The grinding conditions will be dependent on the grinding technique and on the nature of the materials being ground. However, in general it is preferred to carry out the grinding for a period of from 1 hour up to 5 days particularly from 5 up to 50 hours. Any suitable temperature may be used for the grinding, for example, from $-50°$ C. up to 100° C., especially from $-10°$ C. to 80° C., and, if desired, the temperature may be varied during the grinding operation. The grinding may be carried out without applying heating or cooling to the pulverising apparatus. However, the conditions of grinding are generally such that heat is generated during the grinding and hence, in order to operate at an essentially constant temperature for example ambient temperature, which is the generally desired procedure, it may be necessary to apply cooling to the grinding apparatus. The need for cooling will be dependent on the mill size and the milling conditions.

The intensity of grinding will be dependent upon the type of grinding apparatus which is being used. Using a rotating ball mill, it is preferred that the mill is rotated at between 50% and 90% of the critical speed. By critical speed is meant the speed at which particles and balls are held by centrifugal force against the walls of the mill and do not tumble. Using a vibration mill, the mill is preferably operated to give an acceleration of between 12 and 200 meters per sec$^2$. Since the vibration mill gives a more intensive grinding using such a mill a shorter time of grinding is possible than when a rotating ball mill is used.

If the magnesium halide is contacted with a Lewis Base compound during the grinding, it is convenient to add the Lewis Base compound to the magnesium halide either shortly after adding the non-metallic halide or at the same time as the non-metallic halide is added. If the non-metallic halide is added first, and contacting is effected by grinding, it is preferred to effect the grinding for from 30 minutes up to 30 hours, particularly one up to six hours, before the Lewis Base compound is added, and to continue grinding in the presence of the added Lewis Base compound, preferably for at least 5 hours up to 30 hours.

The product obtained by contacting the magnesium halide with the non-metallic halide and the optional Lewis Base compound is contacted with titanium tetrachloride. This contacting may be effected using a liquid phase containing titanium tetrachloride, wherein the liquid phase generally contains more than 25% by weight of titanium tetrachloride, and it is preferred that the liquid phase contains at least 45% by weight of titanium tetrachloride. It is especially preferred that the liquid phase consists solely of liquid titanium tetrachloride. If a solution of titanium tetrachloride is used, the solvent is preferably an inert material, particularly an inert hydrocarbon or halohydrocarbon, especially an aliphatic hydrocarbon.

The contacting of the magnesium halide material with titanium tetrachloride may be effected by suspending the magnesium halide material in an excess quantity of titanium tetrachloride, especially undiluted titanium tetrachloride, and agitating the mixture, for example by stirring. In effecting contacting in this manner, the volume of the liquid is generally not less than the volume of the magnesium halide material and typically there is used 1 to 10, especially 2 to 8 volumes of the liquid for each volume of the magnesium halide material. Preferably, the contacting of the magnesium halide material with the titanium tetrachloride in the foregoing manner is effected, at least partially, at an elevated temperature which is conveniently at least 60° C. up to the boiling temperature of the liquid phase, which is 137° C. when the liquid phase is undiluted titanium tetrachloride. Preferably, the contacting is effected at a temperature in the range 80° C. up to 120° C. The magnesium halide material may be contacted with the titanium tetrachloride when the liquid is at the desired elevated temperature or the magnesium halide material may be added to the liquid at a lower temperature, which is conveniently ambient temperature, and the mixture is then heated to the desired elevated temperature.

As an alternative to suspending the magnesium halide material in the titanium tetrachloride, the contacting of the magnesium halide material with titanium tetrachloride may be effected by grinding. If the initial stages of the process have been effected by grinding, the contacting with the titanium tetrachloride can be effected in the same grinding apparatus, by adding titanium tetrachloride, preferably as undiluted titanium tetrachloride, and continuing to grind for a suitable period of time. If the materials are ground together, the volume of the titanium tetrachloride is preferably less than the volume of the magnesium halide material. Preferably, not more than one mole of titanium tetrachloride is present during the grinding for each mole of the magnesium halide, and the amount of titanium tetrachloride is typically from 0.01 up to 0.5, and especially from 0.02 up to 0.1, moles for each mole of the magnesium halide material. If a Lewis Base compound has been used in the process, the proportion of titanium tetrachloride used in the grinding is conveniently from 0.5 up to 2 moles, and especially one mole, for each mole of the Lewis Base compound. If desired, a complex of the Lewis Base compound and titanium tetrachloride may be used. The grinding of the magnesium halide material and the titanium tetrachloride may be effected at a temperature in the range which is suitable for the grinding with the non-metallic halide and the optional Lewis Base compound, and is conveniently effected without applying heating or cooling to the grinding apparatus.

If contacting with titanium tetrachloride is effected in more than one stage, such a procedure may be effected by grinding the magnesium halide material with titanium tetrachloride and thereafter suspending the product in titanium tetrachloride.

If the magnesium halide material is suspended in titanium tetrachloride to effect contacting, the contacting is conveniently effected for a period of time of from 0.25 hours up to 10 hours, for example 0.5 up to 5 hours. If contacting is effected by grinding, a longer period of time may be used such as up to 100 hours, for example from 2 up to 80 hours, conveniently 5 up to 30 hours.

After the required time of contacting, the product obtained is preferably separated from any excess liquid phase which is present. The separation is effected by any suitable technique, for example by allowing the solid to settle and removing the supernatant liquid phase from the settled solid by a technique such as decantation, or using a siphon, or by using a technique such as filtration which gives essentially complete separation. Although filtration gives more complete separation than is readily achieved by settling and removing the supernatant liquid, we have found that, when operating in accordance with the present invention, the solid may include fine particulate material, the presence of which can cause blockage of the filter and this is undesirable on a commercial scale and outweighs any advantage of complete separation.

The contacting with titanium tetrachloride may be repeated, preferably not more than once. This repeat contacting is effected under the conditions hereinbefore described. If more than one contacting step is effected, it is convenient, but not essential, for each step to be effected under essentially the same conditions of temperature and time.

After contacting the magnesium halide material with titanium tetrachloride, the product is preferably separated from any excess liquid phase which is present and thereafter washed at least once with an inert hydrocarbon or halohydrocarbon. Suitable inert liquids include hexane, heptane, octane, decane, dodecane and mixtures of the isomers thereof, and aromatic liquids such as benzene and toluene, and halohydrocarbons such as 1,2-dichloroethane and chlorobenzene. The washing is conveniently effected by suspending the solid in the inert liquid hydrocarbon or halohydrocarbon medium and agitating the mixture for a period of time of at least 0.25 hours up to 10 hours conveniently 0.5 up to 5 hours. The number of washing steps used will depend on the quantity of the inert liquid hydrocarbon or halohydrocarbon used in each washing step and the time and temperature of each washing step. The washing step may be effected at ambient temperature but it is preferred that at least one washing step is effected under conditions such that the inert liquid hydrocarbon or halohydrocarbon attains an elevated temperature which is in the range 60° C. up to 120° C., and especially at least 80° C.

The at least one washing step is believed to remove some complexes of titanium tetrachloride and the ester from the product and also to remove any excess unreacted titanium tetrachloride which remains after the contacting with the titanium tetrachloride. For the removal of the complexes, it is desirable that the at least one washing step, and particularly at least the first washing step when several washing steps are used, is effected at an elevated temperature of at least 60° C., particularly at least 80° C. However, if more than one washing step is used, the washing steps after the first step may be effected at a lower temperature. If the liquid medium is separated from the solid by a decantation process, or by using a siphon, the solid contains unseparated liquid which typically includes unreacted titanium tetrachloride and the proportion of this unreacted titanium tetrachloride can be reduced by washing at ambient temperature.

If the magnesium halide material has been suspended in titanium tetrachloride at an elevated temperature, it is preferred to effect the washing step, or the first wasing step, before any substantial cooling has occurred after separating the solid from the titanium tetrachloride. Thus, it is preferred to add the inert hydrocarbon or halohydrocarbon liquid to the separated solid within a few minutes, for example within one to 30 minutes, of removing the titanium tetrachloride. However, it will be appreciated that if the magnesium halide material is ground with titanium tetrachloride, since such a process preferably does not use an excess amount of a liquid material, the foregoing procedure may not be required. The at least one washing step is conveniently effected in a vessel containing heating means, such as an outer jacket for a heating fluid, and it is preferred to continue heating during the washing step or during at least the first of the washing steps. The washing may be effected without allowing any appreciable cooling of the separated solid to occur and adding the inert hydrocarbon or halohydrocarbon liquid at ambient temperature whilst still supplying heat to the solid, and the added liquid. The washing step, or each washing step, is effected by suspending the solid in the inert hydrocarbon or halohydrocarbon liquid and agitating the mixture for a period of time which may be from 5 minutes up to 10 hours, and which is preferably from 15 minutes up to 4 hours. If the solid has been obtained by grinding with titanium tetrachloride, or has been separated from the titanium tetrachloride and allowed to cool appreciably, for example to ambient temperature, it is desirable that the at least one washing step, or at least the first washing step, is effected at an elevated temperature of at least 80° C., for example using heptane at reflux temperature, and that the elevated temperature is maintained for at least two hours, in order to ensure that materials which are insoluble at the initial low temperature may be dissolved in the hot inert hydrocarbon or halohydrocarbon liquid.

The quantity of the inert hydrocarbon or halohydrocarbon liquid used for the at least one washing step is conveniently in the range from 5 cm$^3$ to 20 cm$^3$ for each gramme of the magnesium halide material, particularly from 8 cm³ to 12 cm³ for each gramme of the magnesium halide material.

If the magnesium halide material is suspended in undiluted titanium tetrachloride, if the washing step, or at least the first washing step, is effected before the separated magnesium halide material has cooled appreciably, for example before the separated magnesium halide material has cooled below 70° C., and if heating is continued throughout the washing, we have found that satisfactory products can be obtained using not more than two washing steps at an elevated temperature of at least 60° C. Usng such a procedure, adequate washing may be achieved by agitating the mixture of the separated magnesium halide material and the inert hydrocarbon or halohydrocarbon liquid at the elevated temperature and continuing the agitation for from 5 minutes up to two hours, typically for 10 minutes up to an hour before either separating the solid from the liquid or allowing the solid to settle. After washing at the elevated temperature, if the liquid is separated by decantation or by using a siphon, further washes may be effected at a lower temperature, typically at ambient temperature, to reduce the proportion of unreacted titanium tetrachloride which remains with the solid.

If the magnesium halide material is at ambient temperature, for example as a result of being allowed to cool to ambient temperature, before effecting the, or the first, washing step, it is preferred to effect the washing step, or the first washing step, at the elevated temperature usng a higher temperature and/or for a longer period of time in order to ensure that materials which are insoluble at the initial low temperature, such as complexes of titanium tetrachloride and the ester, are dissolved and extracted by the washing step.

After the, or each, washing step, the magnesium halide material may be separated from the liquid phase by filtration, decantation or by means or a siphon. The latter two techniques do not remove all of the liquid from the solid and hence more washing steps may be required to remove unreacted titanium tetrachloride from the solid. However, the magnesium halide material may contain a significant proportion (for example at least 10% by weight) of particles having a particle size of less than 5 microns, and the presence of such small particles may adversely effect the efficiency of a filtration process. Using a siphon to effect separation of the magnesium halide material from the liquid, we have obtained a satisfactory product by effecting a first washing step at a temperature of about 100° C., a second washing step with the temperature rising to be in the range 35° to 60° C. and one further washing step at essentially ambient temperature.

According to a preferred aspect of the present invention, it is not necessary to remove all of the removable titanium materials by the optional washing steps. Indeed, we have obtained solid, titanium-containing materials which contain a substantial proportion of titanium species which can be removed by continued hot washing with an inert hydrocarbon or halohydrocarbon liquid, and we have found that such materials, when used as a catalyst component to polymerise propylene, give a high yield of a polymer having good stereoregularity (more than 90% is insoluble in boiling heptane). We have found that continued hot washing can reduce the titanium content of the final product to below one percent by weight but we prefer that the titanium content of the final product is in the range from 1.5 up to 3% by weight and particularly that the titanium content is not below 2% by weight. In the preferred products obtained by the process of the present invention, a proportion which is at least 25%, and may be in excess of 50%, of the titanium-containing species present in the solid product is capable of being removed by continued hot washing with an inert hydrocarbon or halohydrocarbon liquid. However, in general, the presence of such quantities of extractable titanium species does not detract from the characteristics of the product when used as a component of an olefin polymerisation catalyst which has high activity and high stereospecificity.

The magnesium halide is typically contacted with the optional Lewis Base compound by a grinding process. The product obtained by the grinding process typically contains a significant proportion, typically at least 10% by weight, of particles of a fine particle size of less than 5 microns. Furthermore, the ground product, in addition to having a poor particle size distribution, also has a particle form which is not ideal for a catalyst component. Since the particle form of the particles of the solid catalyst component may be replicated by the polymer product, for example when polymerising propylene, the particle form, and in particular the powder flow, of the polymer product will not be ideal. Furthermore, if the polymerisation is effected by a gas phase process, particularly a fluidised bed process, the fine particle size materials will be readily entrained in the circulating gas stream and removed from the polymerisation reactor. This could result in the presence of a highly active catalyst in the circulating gas stream which causes continuing polymerisation with the consequential deposition of polymer in, and possibly blocking of, the circulating gas loop. To minimise these problems, it is desirable to improve the particle form of the solid titanium-containing material which is the product of the process of the present invention.

The particle form of the final product may be improved by suspending a solid material in an inert liquid medium, spray-drying the suspension formed and collecting a spray-dried solid material wherein the solid material is a magnesium halide or a solid obtained in a subsequent stage of the process of the present invention, including the product of the final stage. The solid material which is spray-dried may be the magnesium halide material which has been contacted with the non-metallic halide and/or the optional Lewis Base compound, or may be the solid titanium-containing materail which is the product obtained by the process of the present invention. If the magnesium halide material is spray-dried, the spray-dried product thereby obtained may be contacted thereafter, without grinding, with a liquid phase containing titanium tetrachloride in accordance with the process of the present invention. Alternatively, a spray-dried magnesium halide material is contacted first with the non-metallic halide and thereafter with a liquid phase containing titanium tetrachloride.

Thus, as a further aspect of the present invention, a spray-dried step may be incorporated either before the first stage, between two successive stages or after the final stage of the process hereinbefore described.

The spray-drying step can be effected using conventional spray-drying techniques. To effect spray-drying, the suspension is passed through a suitable atomizer which creates a spray or dispersion of droplets of the suspension, a stream of a hot gas is arranged to contact the droplets and cause evaporation of the liquid medum and the solid product which separates is collected. Suitable atomizers for producing the droplets of the suspension include nozzle atomizers and spinning disc atomizers. The inert liquid medium used for the spray-drying may be any liquid medium which does not have a deleterious effect on the characteristics of an olefin polymerisation catalyst system which incorporates the spary dried material. Typically the inert liquid medium is a liquid hydrocarbon such as an aliphatic, aromatic or cycloaliphatic hydrocarbon or a halohydrocarbon such as chlorobenzene, but other materials such as titanium tetrachloride or polar materials such as esters may be used even though such materials are not normally regarded as inert when used in an olefin polymerisation process.

The product obtained by includng a spray-drying stage in the process of the present invention typically contains a reduced proportion of fine particulate material and has a particle form which is generally spherical. The product obtained by using a spray-drying stage is suitable for effecting polymerisation in the gas phase.

Spray-drying of suspensions which include a transition metal compound, particularly where at least a part of the solid component of the suspension is, or contains, a transition metal compound, is the subject of our European Patent Application Publication No. 0 037 182. After contacting the magnesium halide material with titanium tetrachloride, the product contains a titanium chloride species and may be spray-dried in accordance with European Patent Application Publication No. 0 037 182. However, the spray-drying step may be effected using a magnesium halide or an intermediate product which has not been contacted with titanium tetrachloride and thereafter effecting the subsequent stages of the present invention usng the spray-dried support material. Spray-drying of catalyst supports such as silica, alumina and particularly magnesium halide materials and subsequently contacting the spray-dried support material with a transition metal compound is the subject of our copending U.S. Patent Ser. No. 405,984 entitled "Supported Transition Metal Composition".

The various solid materials obtained at different stages of the present invention typically include not only fine particles but also some coarser particles having a particle size which exceeds 50 microns. The presence of such coarser parties may cause blocking of a spray-drying apparatus or may result in the spray-dried material containing such coarser particles which have been essentially unaffected by the spray-drying and have an undesirable particle size and/or shape.

As a preliminary stage before spray-drying, a suspension of the solid in a liquid medium may be sbjected to mechanical action to cause a reduction in the particle size of the solid material, for example using a ball mill or a device which is suitable for the production of a liquid-liquid emulsion, as is described in more detail in our copending U. S. Patent Application Ser. No. 405,983 entitled "Spraying Solid". Suitable devices for the production of a liquid-liquid emulsion which can be used are stirrers of the Ultra Turrax type (available from Jake and Kunkel KG IKA Werke) and high shear mixers such as are available from Silverson Machines Limited of Chesham, Buckinghamshire, England. The procedure of subjecting a suspension to mechanical action may be used at any stage of the present invention and the thus-treated suspension is then spray-dried, the spray-dried solid collected and subjected to any remaining stages of the process of the present invention.

If a spray-drying step is included, the spray-dried solid is an agglomerate of smaller particles. In general, in using the spray-dried solid it will be subjected to shearing forces due to agitation or being circulated through pipe-work, and these shearing forces may cause at least some break-down of the spray-dried solid to smaller particles. To minimise such break-down it is preferred to incorporate into the spray-dried solid a material which renders the spray-dried solid more resistant to attrition and which may also assist in the agglomeration of the solid particles during the spray-drying step. For convenience hereafter, such a material will be referred to as an "attrition inhibitor".

The attrition inhibitor is conveniently present during the spray-drying stage and is typically present as a solution in the inert liquid medium in which the solid is suspended. The attrition inhibitor should be such that, or should be used in an amount such that, it does not have an appreciable adverse effect on the activity and stereospecificity of an olefin polymerisation catalyst system which includes a solid material obtained by includng a spray-drying step in the process of the present invention. If the material obtained by the use of a spray-drying step is subsequently to be suspended in a liquid medium, the attrition inhibitor preferably should be such as to at least minimise dispersion of the spray-dried solid material into smaller particles in the presence of the liquid medium in which the solid is to be suspended. Hence, the attrition inhibitor is preferably soluble in the liquid medium used for the spray-drying step but is insoluble, or of low solubiltiy, in any liquid medium in which the solid is suspended after effecting the spray-drying step.

The attrition inhibitor may be, for example, polystyrene, polymethylmethacrylate, polyvinylacetate, atactic polypropylene, or an AB block copolymer for example of t-butylstyrene-styrene. It will be appreciated that not all attrition inhibitors will be equally effective. The use of an attrition inhibitor during the spray-drying of the suspension can result in the spray-dried solid material being in the form of firmer agglomerates than a similar spray-dried solid material obtained without using attrition inhibitor. The amount of the attrition inhibitor is preferably from 0.5% up to 10% by weight relative to the solid material present in the suspension. The suspension containing the attrition inhibitor is spray-dried using conventional spray-drying techniques, for example such as are described in our European Patent application Publication No. 0 037 182.

If the spray-dried magnesium halide material is subsequently contacted with the non-metallic halide, typically this is effected using the non-metallic halide in the proportions as hereinbefore described. Conveniently this contacting is effected using the non-metallic halide as a solution in a suitable inert solvent, such as a hydrocarbon solvent. The contacting is effected at a temperature which is conveniently in the range from ambient temperature up to 100° C., especially up to 60° C. The solution of the non-metallic halide is preferably separated, at least partially, from the spray-dried magnesium halide material and the solid is then suspended in titanium tetrachloride in the manner hereinbefore described. If desired, the contacting of the spray-dried magnesium halide material with the non-metallic halide is additional to a stage of contacting with the non-metallic halide which has been effected as a previous stage of the process of the present invention. If the magnesium halide is contacted with the non-metallic halide in more than one stage, the amount of the non-metallic halide used in each stage is conveniently not more than 5% by weight relative to the magnesium halide and particularly the amount of the non-metallic halide used in all stages does not exceed 50% by weight relative to the magnesium halide.

We have found that the product obtained by the process of the present invention, with or without the spray-drying step, may be used in combination with organic metal compounds, and preferably Lewis Base compounds, to give a polymerisation catalyst and that this catalyst has a high activity and stereospecificity when used for the polymerisation of alpha-olefin monomers.

According to a further aspect of the present invention there is provided a polymerisation catalyst which comprises A. A titanium-containing composition produced by a process as hereinbefore described; and B. An organic compound of aluminium or of a non-transition metal of Group IIA of the Periodic Table, or a complex of an organic compound of a non-transition metal of Group IA or IIA of the Periodic Table together with an organic aluminium compound.

Component B of the catalyst system may be an organic magnesium compound or a mixture or complex thereof with an organic aluminium compound. Alternatively, a complex of a metal of Group IA with an organic aluminium compound may be used, for example, a compound of the type lithium aluminium tetraalkyl. However, it is preferred to use an organic aluminium compound and in particular it is preferred to use a trihydrocarbon aluminium compound such as an aluminium trialkyl compound, particularly one in which the alkyl group contains from 1 up to 10 carbon atoms, for example, aluminium triethyl, aluminium tri-isobutyl or aluminium trioctyl.

In addition to Components A and B, it is preferred that the catalyst system includes a Lewis Base compound.

The Lewis Base compound which is used in the additional stage can be any organic Lewis Base compound which has been proposed for use in a Ziegler polymerisation catalyst and which affects either the activity or stereospecificity of such a catalyst system. Thus, the Lewis Base compound may be an ether, an ester, a ketone, an alcohol, a phenol, an ortho-ester, a sulphide (a thioether), an ester of a thiocarboxylic acid (a thioester), a thioketone, a thiol, a sulphone a sulphonamide, a fused ring compound containing a heterocyclic sulphur atom, an organic silicon compound such as a silane or siloxane, an amine, a urea, substituted ureas, thiourea, amines and derivatives thereof, and organic phosphorus compounds. The use of organic Lewis Base compounds has been disclosed, inter alia, in British patent specifications Nos. 803,198; 809,717; 880,998; 896,509; 920,118; 921,954; 933,236; 940,125; 966,025; 969,074; 971,248; 1,013,63; 1,017,977; 1,049,723; 1,150,845; 1,208,815; 1,234,657; 1,324,173; 1,359,328; 1,383,207; 1,387,890; 1,423,658; 1,423,659; 1,423,660; 1,495,031; 1,527,736; 1,554,574 and 1,559,194.

The Lewis Base component may be an ester, for example an ester of the formula $R^1COOR^2$ as hereinbefore described. Of these esters, it is particularly preferred to use an alkyl ester of a carboxylic acid containing an aromatic group such as, for example ethyl benzoate, butyl benzoate, methyl 4-methylbenzoate, ethyl 4-methoxybenzoate and ethyl phenylacetate.

Alternatively, the Lewis Base component may be a silicon compound, particularly one containing one or more Si—$OR^3$ or Si-$OCOR^3$ or Si—$NR^3$ bonds, where $R^3$ is a hydrocarbyl group. Silicon compounds which may be used include phenyltriethoxysilane, diphenyldiethoxysilane and n-butyltriethoxysilane.

In the polymerisation catalyst it is preferred to use at lest one mole of the organic metal compound which is Component B for each mole of titanium which is present in Component A of the catalyst system. In general, at least 10 moles of the organic metal compound are used for each mole of titanium, but the proportion of Component B preferably does not exceed 250 moles per mole of titanium in Component A. Especially preferred proportions of Component B are from 10 up to 60 moles of the organic metal compound for each mole of titanium.

The preferred catalyst systems also include a Lewis Base compound and the proportion of Lewis Base compound should not exceed the proportion of Component B of the catalyst system. Preferably, when the Lewis Base compound is an ester, there is used from 0.1 up to 0.5 moles, especially from 0.25 up to 0.4 moles, of the ester for each mole of Component B. If the Lewis Base compound is a silicon compound, it is preferred to use 0.02 up to 0.2, for example 0.1, moles of the silicon compound for each mole of component B.

The catalyst system of the present invention may be obtained by pre-mixing Components A, B and optional Component C before introducing the catalyst system into the polymerisation reactor. Alternatively, all the catalyst components may be introduced separately into the polymerisation reactor. A further alternative procedure is to add Component A of the catalyst system separately and to add Components B and C as a mixture. As disclosed in our co-pending British Patent application No. 8124145 entitled "Olefin Polymerisation Process", when Component B is an aluminium trialkyl and Component C is an ester of a carboxylic acid containing an aromatic group, if Components B and C are premixed, it is particularly preferred to mix and to store the mixture in the presence of an olefin monomer.

The catalyst systems of the present invention are suitable for the polymerisation or copolymerisation of unsaturated monomers, particularly ethylenically unsaturated hydrocarbon monomers such as the alpha-olefin monomers.

As a further aspect of the present invention there is provided a process for the production of a polymer or copolymer of an unsaturated monomer wherein at least one unsaturated hydrocarbon monomer is contacted under polymerisation conditions with a polymerisation catalyst as hereinbefore described.

The monomer which may be used in accordance with the present invenion has the formula $CH_2=CHR^4$ wherein $R^4$ is a hydrogen atom or a hydrocarbon radical.

Thus, the monomers which may be polymerised by the process of the present invention include ethylene, propylene, butene-1, pentene-1, hexene-1,4-methylpentene-1, styrene, 1,3-butadiene or any other monomer having the above formula. The monomer is preferably an olefin monomer, particularly an aliphatic mono-alpha-olefin monomer which contains from 2 up to 10 carbon atoms.

The monomers may be homopolymerised or may be copolymerised together. If a copolymerisation is being effected this may be done using a mixture of monomers which has essentially the same composition throughout the polymerisation process. Alternatively, a sequential polymerisation process, such as described in British Pat. Nos. 970,478; 970,479 and 1,014,944, may be used.

The present invention is particularly suitable for the polymerisation of ethylene or propylene, and especially for the polymerisation of propylene in the gas phase.

Thus, as a further aspect of the present invention, there is provided a process for the polymerisation of propylene which comprises contacting gaseous propylene in the substantial absence of any liquid phase with a polymerisation catalyst of the type hereinbefore described.

Using the process of the present invention, it is possible to obtain, as a drect product of polymerisation, a propylene polymer having a titanium content of not more than 7 parts per million by weight, a chlorine content of less than 200 parts per million by weight and containing less than 7% by weight of polymer which is soluble in boiling heptane.

Preferred polymers have a titanium content of less than 5 parts per million by weight. In the preferred polymers the chlorine content is less than 150 parts per million by weight. Propylene polymers in accordance with the invention preferably contain not more than 5% by weight of polymer which is soluble in boiling heptane. The polymer may be formed into mouldings which have a flexural modulus of at least 1.40 $GN/m^2$, especially at least 1.50 $GN/m^2$. The flexural modulus is determined from the deformation of a test strip at 1% skin strain after 60 seconds at 23° C. and 50% relative humidity measured using a cantilever beam apparatus as described in "Polymer Age", March 1970, pages 57 and 58, using a test strip prepared as described in the detail hereafter in Note (f) to Table Two.

The low proportion of polymer which is soluble in boiling heptane and the high flexural modulus both indicate the high stereoregularity of the propylene polymers of the present invention.

Although the polymerisation process of the present invention is particularly suitable for gas phase polymerisation, it will be appreciated that this does not exclude the possibility of carrying out the polymerisation in the liquid phase where the liquid phase may be an inert hydrocarbon medium or a liquid olefine monomer. If polymerisation is effected in the gas phase, the monomer may be introduced into the polymerisation vessel as a liquid with the conditions of temperature and pressure within the polymerisation vessel being such that a major proportion of the liquid monomer vaporises, thereby giving an evaporative cooling effect, whereby the polymerisation vessel contains a solid phase which is the polymerisation catalyst and the polymer formed thereon and a gaseous monomer phase with only a minor proportion of liquid monomer. Polymerisation in the gas phase may be effected using conditions which are such that the monomer is at a temperature and partial pressure which are close to the dew point temperature and pressure for that monomer, for example, as described in more detail in British patent specification No. 1,532,445. Polymerisation in the gas phase may be effected using any technique suitable for effecting a gas-solid reaction, such as a fluidised-bed reactor system, a stirred-bed reactor system or a ribbon-blender type of reactor.

It will be appreciated that the catalyst system hereinbefore described is of the type generally known as a Ziegler-Natta type of catalyst system. As is well known, Ziegler-Natta type catalysts are susceptible to the presence of impurities in the polymerisation system. Accordingly, particularly when a high yield of polymer is desired in relation to the transition metal component of the catalyst system, it is desirable to effect the polymerisation using reagents, that is monomer and possibly diluent, which have a high degree of purity, for example, a monomer which contains less than 5 ppm by weight of water and less than 1 ppm by weight of oxygen. Materials having a high degree of purity can be obtained by processes such as those described in British Patent Specifications Nos. 1,111,493; 1,226,659, and 1,383,611.

The polymerisation may be effected either in a batch manner or on a continuous basis. The catalyst components may be introduced into the polymerisation vessel separately. It is preferred that the polymerisation is effected in the presence of a Lewis Base compound and that this Lewis Base compound is pre-mixed with the organic metal compound which is Component B of the catalyst system before the mixture of the two components is introduced into the polymerisation medium.

When carrying out polymerisation on a continuous basis, we have found that particularly useful effects are obtained if the organic metal compound and the Lewis Base compound are pre-mixed just before being introduced into the polymerisation reaction vessel, or if the pre-mixture has been stored in the presence of an olefine monomer.

Thus, as a preferred aspect of the present invention, polymerisation is carried out on a continuous basis using a catalyst system including a Lewis Base compound, the catalyst components are introduced into the polymerisation medium intermittently, and Component B and the Lewis Base compound either (a) are mixed together not more than one hour before being introduced into the polymerisation medium, or (b) are mixed together and stored in the presence of an olefine monomer until introduced into the polymerisation medium.

Procedure (b), is the subject of our published British Patent Specification No. 2103626A entitled "Olefin Polymerisation Process".

The polymerisation can be effected in the presence of a chain transfer agent such as hydrogen or a zinc dialkyl in order to control the molecular weight of the polymer product. The proportion of chain transfer agent used will be dependent on the polymerisation conditions and on the particular monomer or monomer mixture which is being polymerised. Using hydrogen in the polymerisation of propylene, it is preferred to use hydrogen in an amount of from 0.01 up to 5.0%, particularly from 0.05 up to 2.0% molar relative to the monomer. However, when the monomer being polymerised is ethylene, or a mixture in which ethylene is a major polymerisable component (by moles), the amount of hydrogen used is typically much greater, for example, in the homopolymerisation of ethylene the reaction mixture may contain in excess of 50% molar of hydrogen, whereas if ethylene is being copolymerised, the proportion of hydrogen used is typically up to 35% molar of the total reaction mixture.

The polymerisation can be effected under any conditions which have been previously proposed for effecting the polymerisation of olefin monomers. Thus, ethylene polymerisation may be effected at pressures of up to 3000 $kg/cm^2$, and at such pressures the polymerisation temperature may be as high as 300° C. However, it is preferred to carry out the polymerisation at comparatively low pressures and temperatures, particularly for the production of polymers of the higher olefines (including propylene) which have a high stereoregularity. More specifically, the polymerisation is effected at pressures in the range from 1 up to 100 kg/cm$^2$, preferably at a pressure of up to 50 kg/cm$^2$ and especially at pressures in the range from 5 up to 40 kg/cm$^2$.

The polymerisation temperature used will be dependent in part on the particular polymerisation technique being used. Thus, it is possible to use polymerisation temperatures in excess of the melting point of the polymer and such conditions may be used in the polymerisation, or copolymerisation, of ethylene in the presence of a hydrocarbon liquid which can act as a solvent for the polymer formed. However, in general, it is preferred to use temperatures below the melting temperature of the polymer formed and in particular it is preferred to use temperatures of not more than 100° C. The polymerisation temperature is typically in the range from 40° C. up to 100° C.

It is generally preferred to effect all stages in the preparation of the titanium-containing composition in an inert atmosphere which is essentially free from oxygen-containing impurities such as water vapour. Very preferably the polymerisation process of the present invention should also be effected in the absence of materials which have a harmful effect on the polymerisation process.

Figure 2:
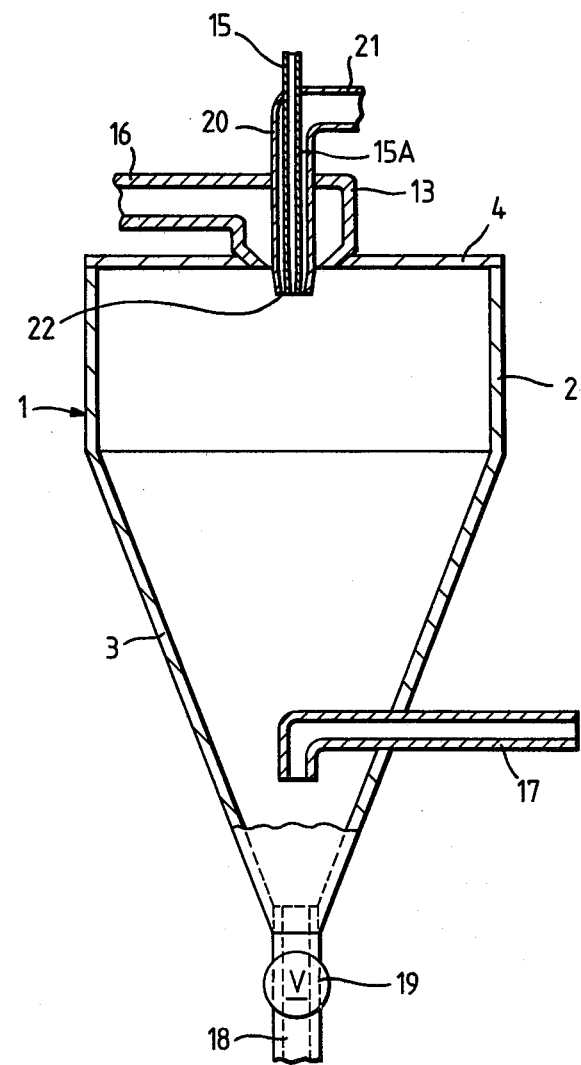

Apparatus suitable for effecting the optional spray-drying step is shown in the accompanying drawings wherein:

in FIG. 1 there is given a cross-sectional elevation of typical spray-drying apparatus which can be used to perform the optional spray-drying step; and in FIG. 2 there is given a cross-sectional elevation of an alternative apparatus with an atomising nozzle.

In FIG. 1, a gas-tight spray-drying vessel 1 comprises an upper cylindrical section 2 and a lower, generally conical section 3. The upper section 2 is provided with a cover plate 4.

A disc 5 mounted on the end of an output shaft 6 of a high speed gear box/motor assembly 7 is located near the top of the vessel. The disc 5 consists of two plates 8 and 9 between which are secured a series of radial vanes 10. A chamber 11 surrounds the drive shaft 6 and extends to the upper plate 8 of the disc 5. The plate 8 is provided with a central opening indicated at 12.

A plenum chamber 13, which is mounted on the cover plate 4, surrounds the chamber 11. The plenum chamber 13, communicates with the vessel 1 through an annular opening 14 between a central opening in the cover plate 4 and the downward extension of the chamber 11.

A conduit 15 is connected to the chamber 11 and also to a source (not shown) of a suspension containing a solid material. A conduit 16 is connected to the plenum chamber 13 and also to a source (not shown) of a heated inert gas.

Near the bottom of the vessel 1 is located a conduit 17 which passes out of vessel 1 through the side of the conical section 3. A conduit 18, in which is located a valve means 19, is connected to the bottom of the conical section 3 and is also connected to a hopper (not shown) for storing dry solid.

In operation, the disc 5 is rotated at a high speed in the range from 500 up to 25,000 rpm. A suspension containing a solid material and an inert liquid medium, for example a magnesium chloride-ethyl benzoate product in toluene, is passed through the conduit 15 and chamber 11 into the space between the plates 8 and 9 of the disc 5. The high speed of rotation of the disc 5, and the vanes 10, cause the suspension to pass to the periphery of the disc 5 from which the suspension is flung off as a spray of droplets.

A hot inert gas is passed through the conduit 16, plenum chamber 13 and the annular opening 14 to flow around the rotating disc 5. The hot inert gas causes evaporation of the liquid medium from the droplets of the suspension.

The inert gas containing the vaporised liquid medium and some entrained spray-dried solid, passes out of the vessel 1 through the conduit 17. The major portion of the spray-dried solid collets at the bottom of the conical section 3 from which it is withdrawn through the conduit 18 by operation of the valve means 19.

The inert gas passing through the conduit 17 may be passed to a cyclone (not shown) to recover entrained solid, then to a condenser (not shown) to recover the liquid vapour and finally to a re-heater (not shown). The reheated inert gas is then recirculated to the conduit 16. The spray-dried solid passing through the conduit 18 is passed to a storage hopper (not shown).

The inert gas passed through the conduit 16 is conveniently nitrogen at a temperature in the range 130° to 150° C.

The apparatus shown in FIG. 2 is essentially the same as that shown in FIG. 1 with the exception that the disc atomizer is replaced by an atomizer nozzle. In FIG. 2, the corresponding parts are indicated by the same reference numbers as in FIG. 1. An atomizer nozzle 20 is located within the plenum chamber 13. The atomizer nozzle 20 contains an inner conduit 15A and an outer conduit 21. The conduit 15A is a continuation of conduit 15, which is connected to a source (not shown) of a suspension containing a transition metal compound. Conduit 21 is connected to a source (not shown) of an inert gas. The conduits 15A and 21 are essentially coaxial and are tapered at their lower ends. The nozzle 20 is provided at its lower end with an orifice 22 formed by openings in both of conduits 15A and 21.

In operation, the gas flow through the conduit 21 draws the suspension through the conduits 15 and 15A. The gas and the suspension pass through the orifice 22 and form a spray of droplets. Hot inert gas which passes through conduit 16, plenum chamber 13 and opening 14, flows past the orifice 22 and causes evaporation of the liquid medium from the droplets of the suspension. The spray-dried solid is then recovered in the manner described in respect of the apparatus of FIG. 1.

Various aspects of the present invention will now be described with reference to the following Examples which are illustrative of the invention. In the Examples, all operations are effected under an atmosphere of essentially oxygen-and water-free nitrogen unless otherwise indicated. All the glass apparatus was dried in air oven at 120° C. for at least one hour and purged with nitrogen before use.

In the propylene polymerisation had been purified by passing gaseous propylene in turn through a column (7.6 cm diameter, 90 cm length) containing 1.58 mm granules of Alcoa Fl alumina at 50° to 60° C., and then through a similar column containing BTS catalyst (Cupric oxide reduced to finely divided metallic copper on a magnesium oxide support) at 40° to 50° C., condensing the issue gas and passing the liquid propylene through four columns (all 7.6 cm diameter; two of 90 cm in length, two of 1.8 m in length) at 25° C., each containing 1.58 mm pellets of Union Carbide 3A molecular sieves.

This treatment reduced the water content of the monomer from in the range of 5 to 10 ppm by volume down to <1 ppm by volume and the oxygen content from in the range of 1 to 2 ppm by volume down to <0.5 ppm by volume. The level of inert compounds (nitrogen, ethane, etc) was unchanged at 0.3% and the level of other unsaturated hydrocarbons (allene, methylacetylene etc) was unchanged at <1 ppm.

EXAMPLE 1

(A) Milling magnesium chloride, thionyl chloride and ethyl benzoate

A Siebtechnik SM6 Vibromill chamber having a total usable volume of about 1.5 dm$^3$ and containing 180 stainless steel balls of 25 mm diameter was sealed, evacuated to a pressure of $0.3 \times 10^{-3}$ kg/cm$^2$ and purged with nitrogen, to give an atmosphere of nitrogen in the mill.

240 grammes of essentially anhydrous magnesium chloride (BDH technical grade) and 9.6 cm$^3$ of thionyl chloride were introduced into the mill chamber. The mill chamber was then placed in the mill assembly, water at ambient temperature was passed through the jacket of the mill chamber, and the mill assembly was vibrated at a frequency of 1500 oscillations per minute and an amplitude of 2 mm. The vibration was continued for 24 hours whilst continuing to pass water at ambient temperature through the jacket of mill chamber. The mill chamber was cooled by passing a mixture of water and ethylene glycol at $-12°$ C. through the jacket of the mill chamber whilst continuing to vibrate the mill assembly. Vibration of the mill assembly was stopped, 120 cm$^3$ of ethyl benzoate were introduced into the mill assembly and vibration was restarted.

After a further 24 hours vibration whilst passing the cold water/ethylene glycol mixture through the jacket of the mill chamber, the mill chamber was inverted, and vibration was effected to remove the milled magnesium chloride product which was collected under nitrogen. The molar ratio of magnesium chloride to ethyl benzoate in the mill chamber was about 3 to 1.

(B) Contacting with titanium tetrachloride

A sample (356 grammes) of the milled product from stage (A) was transferred to a 5 dm$^3$ jacketted glass vessel which was provided with a stirrer. 3 dm$^3$ of titanium tetrachloride were added to the vessel, the stirrer was started and heating was applied to the jacket. Heating was continued until a temperature of 100° C. was attained. The temperature was maintained at 100° C., and sitrring was continued, for three hours. At the end of three hours, the stirrer was stopped, and the solid was allowed to settle whilst continuing to heat the contents of the vessel. 2.25 hours after terminating the stirring, the supernatant liquid was siphoned off from the settled solid. The heating was switched off and the settled solid allowed to cool over a period of 65 hours.

The contacting with the titanium tetrachloride was repeated by adding 3 dm$^3$ of titanium tetrachloride to the cold residue remaining from the previous contacting, the conditions of treatment being as previously described with the exception that the solid was allowed to settle for 3.75 hours. The settled solid was allowed to cool overnight.

(C) Washing

To the residue remaining from stage B) were added 4 dm$^3$ of a heptane fraction, at least 90% of which is n-heptane (hereafter referred to as the "n-heptane fraction"). The mixture was stirred and heated up to reflux temperature (about 100° C.). Stirring at reflux temperature was continued for one hour and the stirrer was then stopped. After a further 70 minutes, the supernatant liquid was siphoned off from the settled solid which was allowed to stand overnight without heating.

To the cold residue was added 4 dm$^3$ of the n-heptane fraction at ambient temperature. The mixture was stirred for 30 minutes whilst heating to a temperature of 65° C. On attaining 65° C., the stirrer was switched off and the solid allowed to settle. After two hours, the supernatant liquid was siphoned off from the settled solid which was allowed to cool by standing for 160 hours.

To the cold residue were added 4 dm$^3$ of the n-heptane fraction at ambient temperature. The mixture was stirred for 5 minutes, stirring was stopped, the solid was allowed to settle for 2.5 hours and the supernatant liquid was siphoned off from the settled solid. This cold washing procedure was then repeated once more.

The cold residue was finally diluted with the n-heptane fraction at ambient temperature to give a final volume of 1.5 dm$^3$ and the mixture was transferred to a 2 dm$^3$ storage vessel under nitrogen.

A sample (5 cm$^3$) of the mixture obtained was treated with 2N sulphuric acid and the aqueous layer was subjected to spectrophotometric analysis. The solid component had a titanium content of 1.9% by weight.

COMPARATIVE EXAMPLE A

The procedure was similar to that described for Example 1 with the major difference that the milling was effected in the absence of thionyl chloride.

(A) Milling magnesium chloride and ethyl benzoate

A Siebtechnik SM10 Vibromill having a total volume of about 38 dm$^3$ and containing 119 kg of stainless steel balls of 25 mm diameter was sealed and purged with nitrogen to give a nitrogen atmosphere in the mill. A mixture of water and ethylene glycol at 0° C. was passed through the jacket of the mill and the mill was vibrated at a frequency of 1500 oscillations per minute and an amplitude of 2 mm. Four kilogrammes of essentially anhydrous magnesium chloride (BDH technical grade) were introduced into the mill whilst the mill was being vibrated. After the addition of the magnesium chloride, the mill was vibrated for about 15 minutes and 2 dm$^3$ of ethyl benzoate were added to the vibrating mill over a period of about 15 minutes. The mill was then vibrated for a further 24 hours whilst continuing to pass the mixture of water and ethylene glycol at 0° C. through the jacket of the mill.

After 24 hours, the mill was inverted, the inverted mill was vibrated and the milled magnesium chloride-ethyl benzoate was collected under nitrogen. The molar ratio of magnesium chloride to ethyl benzoate in the mill was about 3 to 1.

(B) Contacting with titanium tetrachloride

A sample (276 grammes) of the milled product from stage (A) was transferred to a 5 dm$^3$, jacketted glass vessel which was provided with a stirrer. 2.2 dm$^3$ of titanium tetrachloride were added to the vessel, the stirrer was started and heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. Two hours after terminating the stirring, the supernatant liquid was siphoned off from the settled solid. The heating was switched off and the settled solid allowed to cool overnight.

The contacting with the titanium tetrachloride was repeated by adding 2.2 dm$^3$ of titanium tetrachloride to the cold residue remaining from the previous contacting, the conditions of treatment being as previously described with the exception that the solid was allowed to settle for 3 hours 20 minutes. The settled solid was allowed to cool overnight.

(C) Washing

To the residue remaining from stage (B) were added 3.5 dm$^3$ of the n-heptane fraction at ambient temperature. The mixture was stirred and heated up to reflux temperature. Stirring at reflux temperature was continued for an hour and heating and stirring were both then stopped. After a further 70 minutes, the supernatant liquid was siphoned off from the settled solid.

After 20 minutes, 3 dm$^3$ of the n-heptane fraction at ambient temperature were added, the mixture was stirred and heated up to 65° C. On reaching 65° C, stirring was stopped and the solid was allowed to settle whilst still being heated. After 40 minutes the supernatant liquid was siphoned off and the settled solid was allowed to cool overnight.

To the cold residue were added 3.5 dm$^3$ of the n-heptane fraction, the mixture was stirred for 15 minutes, allowed to settle for 55 minutes and the supernatant liquid siphoned off. This cold washing procedure was then repeated once more.

The cold residue was finally diluted with the n-heptane fraction at ambient temperature to give a final volume of 1.5 dm$^3$ and the mixture was transferred to a 2 dm$^3$ storage vessel under nitrogen.

EXAMPLE 2

(A) Milling magnesium chloride, thionyl chloride and ethyl benzoate

The procedure was as described for stage (A) of Example 1 with the exceptions that 265 grammes of magnesium chloride, 21.0 cm$^3$ of thionyl chloride and 132 cm$^3$ of ethyl benzoate were used, the mill was cooled with a water/ethylene glycol mixture at $-10°$ C., and milling, with cooling, was continued for 43 hours.

(B) Contacting with titanium tetrachloride

The procedure was as described for stage (B) of Example 1 with the modifications as set out hereafter. 350 grammes of the milled product from stage (A) and 2 dm$^3$ of titanium tetrachloride were used. The solid was allowed to settle for one hour 40 minutes and allowed to cool overnight in the first step. In the second step, the solid was allowed to settle for three hours and to cool for 280 hours.

(C) Washing

In each of the first two washing steps, 3.3 dm$^3$ of the n-heptane fraction were used whilst in the subsequent washing steps, 3.6 dm$^3$ of the n-heptane fraction were used.

The first washing step was as described in stage (C) of Example 1 with the exception that the solid was allowed to settle for 3.5 hours.

In the second washing step, the solid was allowed to settle for 2 hours but was not allowed to cool. The heating was then turned off and the supernatant liquid siphoned off.

The third washing step was effected using the hot residue from the second washing step, stirring the mixture for 30 minutes, allowing to settle for 1.5 hours and then allowing to stand overnight.

The fourth washing step was effected on the cold residue from the third washing step and stirring the mixture for 30 minutes.

EXAMPLE 3

(A) Milling magnesium chloride, thionyl chloride and ethyl benzoates

A Siebtechnik SM10 Vibromill having a total volume of about 38 dm$^3$ and containing 119 kg of stainless steel balls of 25 mm diameter was sealed and purged with nitrogen to give a nitrogen atmosphere in the mill.

Two kilogrammes of essentially anhydrous magnesium chloride (BDH technical grade) were introduced into the mill whilst the mill was being vibrated, without being cooled. 90 cm$^3$ of thionyl chloride were added over a period of about three minutes whilst continuing to vibrate the mill. Vibrating, without cooling, was continued for a further two hours during which time the temperature rose to 60° C. A mixture of water and ethylene glycol at $-10°$ C. was passed through the jacket of the mill whilst continuing to vibrate and over a further period of two hours the temperature dropped to 5° C.

One dm$^3$ of ethyl benzoate was then added to the vibrating mill over a period of about 15 minutes and vibration of the mill whilst maintaining a temperature of 5° C. was continued for a further 20 hours. The mill was then inverted and vibrated to remove the milled product from the mill. The milled magnesium chloride-ethyl benzoate was collected under nitrogen.

(B) Contacting with titanium tetrachloride

The procedure was as described for stage (B) of Example 1 with the modifications as set out hereafter, the major modification being that only one contacting step was used.

The contacting was effected using 365 grammes of the milled product from stage (A) and 3 dm$^3$ of titanium tetrachloride. The solid was allowed to settle for three hours and to cool overnight.

(C) Washing 3.5 dm$^3$ of the n-heptane fraction were added to the residue from stage (B). The mixture was stirred, heated up to 100° C. and maintained at that temperature for one hour. The solid was allowed to settle for two hours and the supernatant liquid was siphoned off. Ten minutes later, 3.8 dm$^3$ of the n-heptane fraction were added, the mixture was stirred, heated up to 100° C. and maintained at that temperature for one hour. The solid was allowed to settle for 70 minutes, the supernatant liquid was siphoned off and the settled solid allowed to cool overnight.

The cold residue was suspended in 3.8 dm$^3$ of the n-heptane fraction, stirred for 15 minutes, allowed to settle for two hours and allowed to stand overnight.

The cold washing was repeated using 3 dm$^3$ of the n-heptane fraction and the residue was diluted with the n-heptane fraction to give a total volume of 1.5 dm$^3$. The diluted mixture was transferred to a 2 dm$^3$ storage vessel under nitrogen. The solid component had a titanium content of 1.9% by weight.

EXAMPLE 4

This process used a sample of the milled magnesium chloride-ethyl benzoate which was obtained in stage (A) of Example 3.

(B) Contacting with titanium tetrachloride

This was effected essentially as described in stage (B) of Example 3 using 150 grammes of the milled product of stage (A) of Example 3, 1.3 dm$^3$ of titanium tetrachloride, stirring at 100° C. for two hours and allowing the solid to settle for one hour 40 minutes.

(C) Washing

The cold residue from stage (B) was stirred and heated up to 100° C. 2.3 dm$^3$ of the n-heptane fraction were added over a period of 10 minutes at such a rate that the temperature did not fall below 60° C. Heating was continued to re-establish a temperature of 100° C., the mixture was stirred at that temperature for a further 15 minutes and then allowed to settle for an hour. The supernatant liquid was then siphoned off.

1.9 dm$^3$ of the n-heptane fraction were added to the hot residue from the previous stage to give a temperature of 70° C. The mixture was stirred at 70° C. for five minutes, allowed to settle for 45 minutes, the heat was switched off, the supernatant liquid was siphoned off and the residue allowed to cool overnight.

To the cold residue from the previous step were added 1.8 dm$^3$ of the n-heptane fraction, the mixture was stirred at ambient temperature for 30 minutes, the solid allowed to settle for 30 minutes and the supernatant liquid siphoned off. This cold washing procedure was immediately repeated using 1.5 dm$^3$ of the n-heptane fraction and a stirring time of 20 minutes. The residue was finally diluted with the n-heptane fraction to give a volume of 0.6 dm$^3$ which was stored under nitrogen. The solid component had a titanium content of 1.6% by weight.

EXAMPLE 5

This process used a sample of the milled magnesium chloride-ethyl benzoate which was obtained in stage (A) of Example 3.

(B) Contacting with titanium tetrachloride

The procedure was similar to that described in stage (B) of Example 3 with the exceptions as set out hereafter.

170 grammes of the milled product of stage (A) of Example 3 and 1.5 dm$^3$ of titanium tetrachloride were used. The temperature of 100° C. was maintained for one hour and then the heating was switched off. Stirring was continued for a further 1.5 hours and was then ceased and the solid allowed to settle and cool overnight.

The supernatant liquid was siphoned off from the cold settled solid.

(C) Washing

After removing the supernatant liquid, the mixture was stirred and heated up to 100° C. 1.8 dm$^3$ of the n-heptane fraction were then added and stirring was continued for 15 minutes. The solid was allowed to settle for 1.75 hours and the supernatant liquid was siphoned off.

A further 1.8 dm$^3$ of the n-heptane fraction were added to the residue and the mixture was stirred for 15 minutes whilst continuing to heat. The solid was allowed to settle for 30 minutes, the heat was switched off and the supernatant liquid was siphoned off. This washing step was carried out a further twice and the final residue was diluted with the n-heptane fraction to give a total volume of 800 cm$^3$.

EXAMPLE 6

(A) Milling magnesium chloride, thionyl chloride and ethyl benzoate

The procedure of stage (A) of Example 3 was repeated.

(B) Contacting with titanium tetrachloride

The procedure of stage (B) of Example 3 was repeated using 225 grammes of the milled product of stage (A), 2 dm$^3$ of titanium tetrachloride, heating to a temperature of 120° C. and allowing the solid to settle for one hour 50 minutes.

(C) Washing

The cold residue from stage (B) was stirred and heated up to 100° C. 2.5 dm$^3$ of the n-heptane fraction were added slowly to maintain the temperature above 80° C. Once all the n-heptane fraction had been added, stirring was continued for a further 15 minutes and the solid was allowed to settle for 1.75 hours. The supernatant liquid was siphoned off. The hot residue from the previous step was stirred and 2.5 dm$^3$ of the n-heptane fraction were added slowly to maintain the temperature above 80° C. On completion of the addition of the n-heptane fraction, stirring was continued for 15 minutes and the solid was allowed to settle for 70 minutes. The heating was switched off and then the supernatant liquid was siphoned off.

The hot residue from the previous step was stirred, 2.5 dm$^3$ of the n-heptane fraction were added, the mixture was stirred for 15 minutes and the solid was allowed to settle for 2.75 hours. The residue was allowed to stand overnight.

2.5 dm$^3$ of the n-heptane fraction were added to the cold residue from the previous step, the mixture was stirred for 15 minutes, the solid allowed to settle for two hours and the supernatant liquid siphoned off. The residue was diluted to a volume of one dm$^3$ by the addition of a further quantity of the n-heptane fraction. The solid component had a titanium content of 1.8% by weight.

EXAMPLES 7 AND 8

Propylene was polymerised continuously in the gas phase as described hereafter. To initiate the polymerisation, the reaction vessel initialy contained about 5 kg of polypropylene powder having a flexural modulus of 1.45 GN/m$^2$, and containing 4% by weight of polymer soluble in boiling heptane by Soxhlet extraction for 24 hours.

Polymerisation was effected in a 35 dm$^3$ stainless steel autoclave fitted with a stirrer. Initially, the polypropylene powder was placed in the autoclave. The pressure was reduced to 75 millibars and then nitrogen was added to a pressure of one bar, this procedure being carried out a total of three times. The stirrer was rotated at 60 rpm and stirring was continued throughout the following procedure. The autoclave was heated up to 80° C. and then evacuated to a pressure of 75 millibars. Liquid propylene was added to the autoclave and vaporised to raise the pressure to 20 kg/cm$^2$ gauge. Hydrogen was added separately in the proportion of 1.5% molar relative to the propylene.

Solutions of tri-isobutyl aluminium and methyl 4-methylbenzoate in an aliphatic hydrocarbon diluent consisting essentially of dodecane isomers and having a boiling point in the range 170 to 185° C. (hereafter referred to simply as the "aliphatic hydrocarbon") were fed to the autoclave. A suspension containing a titanium composition obtained by the process of Example 1, Example 3 or Comparative Example A was also introduced into the autoclave. The aluminium compound, the ester and the titanium composition were added until polymerisation was observed to start. Liquid propylene was being introduced, and gaseous propylene vented off, whilst the catalyst was being added.

Once polymerisation had started, venting of the autoclave was stopped, liquid propylene at 20° C. was introduced into the autoclave at a rate to maintain a pressure of 20 kg/cm² gauge, (about 2 kg/hr for a dwell time of 2.5 hours) and polypropylene, saturated with propylene, was intermittently withdrawn from the autoclave at a desired rate, typically about 2 kg of polymer per hour. The temperature and pressure were maintained at 70° C. and 20 kg/cm² gauge respectively. The aluminium compound, the ester and the suspension of the titanium composition were continuously introduced into the autoclave at the rates set out in Table One hereafter.

The rate of adding the suspension of the titanium composition was adjusted to maintain the rate of polymer production at the desired rate. During the operation of the autoclave, the nature of the titanium composition, and the technique of adding the tri-isobutyl aluminium and the methyl 4-methylbenzoate were changed and operation of the autoclave was continued using various different catalyst systems.

Further details of the polymerisation conditions are set out in Table One. Properties of the polymer products removed at various times during the polymerisations are set out in Table Two.

TABLE ONE

| Example or Comp Example (a) | Ti Composition Type (b) | Ti Composition Amount (mM/h) | TBA Amount (mM/h) | MT Amount (mM/h) | DT (hours) (c) |
|---|---|---|---|---|---|
| B* | A | 2.0 | 40 | 15 | 2.0 |
| C* | A | 2.0 | 40 | 15 | 2.5 |
| 7* | 1 | 2.6 | 40 | 15 | 2.0 |
| 8 | 3 | 2.0 | 42 | 16 | 2.5 |

Notes to Table One
(a) *In these examples, the tri-isobutyl aluminium (TBA) and the methyl 4-methylbenzoate (MT) were premixed, in the molar ratio 2.7:1, as solutions in the aliphatic hydrocarbon, and stored for at least 12 hours, both premixing and storage being under propylene at a total pressure of one atmosphere and at ambient temperature, before use of the mixture was commenced. This procedure is the subject of our Published British Patent Specification No. 2103626A entitled "Olefin Polymerisation Process". In the remaining example, solutions of the tri-isobutyl aluminium and the methyl 4-methylbenzoate were separately fed to a "T" piece in the molar ratio 2.7:1 and the mixture was then passed immediately into the autoclave.
(b) Type refers to the Example, or Comparative Example, in which the production of the titanium composition is described.
(c) DT is dwell time and corresponds to:
$$\frac{C \text{ Average weight of polymer bed}}{\text{Weight of polymer removed per hour}}$$

TABLE TWO

| | | Polymer properties | | | | | |
|---|---|---|---|---|---|---|---|
| Example | Time (hours) (d) | MFI (e) | FM (f) | Ti (h) | Al (h) | Cl (h) | HHS (%) (i) |
| B | 13 | 2.7 | 1.38 | 4 | 301 | 149 | 8.4 |
| C | 15 | 5.1 | 1.35 | 6 | 302 | 166 | 8.7 |
| 7 | 17 | 3.6 | 1.38 | 6 | 188 | 164 | 6.6 |
| 8 | 15 | ND | 1.59 | 5 | 191 | 221 | 4.9 |

Notes to Table Two
(d) The time is the time, in hours from the commencement of using the specified catalyst system under the specified operating conditions.
(e) MFI is the melt flow index measured by ASTM Test Method D 1238/70 at 230° C. using a weight of 2.16 kg.
(f) FM is the flexural modulus expressed in GN/m². The flexural modulus was measured using a cantilever beam apparatus as described in Polymer Age, March 1970, pages 57 and 58. The deformation of a test strip at 1% skin strain after 60 seconds at 23° C. and 50% relative humidity was measured. The test strip which had dimensions of approximately 150 × 19 × 1.6 mm, was prepared in the following manner. 23 g of the polymer were mixed with 0.1% by weight of an antioxidant ('Topanol' CA), and the mixture was added to a Brabender Plasticiser, at 190° C., 30 rpm and under a load of 10 kg to convert it to a crepe. The crepe was placed within a template, between aluminium foil and pressed by means of an electric Tangye press at a temperature of 250° C. The pressing was pre-heated for a period of 6 minutes, under just enough pressure to make the polymer flow across the template, that is an applied force of about 1 tonne. After the pre-heat period, the applied force was raised to 15 tonnes in 5 tonne increments, degassing (that is releasing pressure) every 5 tonnes. After 2 minutes at 15 tonnes, the press was cooled by means of air and water for 10 minutes or until room temperature was reached. The plaque obtained was then cut into strips of dimensions 150 × 19 × 1.6 mm. Duplicate strips of each polymer were placed into an annealing oven at 130° C. and after 2 hours at this temperature the heat was switched off and the oven cooled to ambient temperature at 15° C. per hour.
(h) The titanium (Ti), aluminium (Al) and chlorine (Cl) residues from the catalyst are given in parts per million by weight relative to the total polymer product (polymer + catalyst residues) and were measured by X-ray fluorescence on compression moulded discs.
(i) HHS is the proportion by weight of the polymer which is soluble in boiling heptane as determined from the weight loss of a sample of polymer after Soxhlet extraction with heptane for 24 hours.
ND indicates that this property was not determined.

The following Example 9 to 12 illustrate the incorporation, into the process of the present invention, of the wet-milling and spray-drying stages disclosed in more detail in our copending U.S. Patent Application Ser.No. 405,983 entitled "Spraying Solid".

EXAMPLE 9

(A) Milling magnesium chloride, thionyl chloride and ethyl benzoate

The procedure of stage (A) of Example 1 was repeated with the modifications as set out hereafter. 180.5 grammes of the magnesium chloride, 6.6 cm³ of thionyl chloride and 45.5 cm³ of ethyl benzoate were used, the milling with thionyl chloride at ambient temperature was effected for two hours, the mill was cooled to 0° C. over a period of 1.25 hours whilst continuing to mill, the ethyl benzoate was then added and milling at 0° C. was continued for 24 hours. At the end of this stage of the milling, the milled product was not removed from the mill chamber at the completion of the milling with the ethyl benzoate. The molar ratio of magnesium chloride to ethyl benzoate in the mill chamber was about 6 to 1.

(B) Milling with toluene 400 cm³ of toluene were added to the mill chamber whilst continuing to vibrate the mill. Milling was continued in the presence of the added toluene at 0° C. for a further 30 minutes.

After 30 minutes, the mill was inverted, the inverted mill was vibrated and the mixture of the milled solid and toluene was collected under nitrogen. The mill chamber was washed out with a further 300 cm³ of toluene, which was added to the suspension previously removed.

After standing for 65 hours, the milled mixture was still fluid but was viscous. The mixture was stirred and 39 cm³ of a 10% weight/volume solution of polystyrene ('Styron' 686/7- available from Dow Chemical Company) in toluene was added to provide 20.0% by weight of polystyrene relative to the milled solid. This mixture had a solid content of 24% by weight.

(C) Spray drying milled solid/toluene mixture

All of dispersion obtained in stage (B) was spray-dried using a glass laboratory scale spray-drying apparatus similar to that described herein with reference to FIG. 2 of the accompanying drawings. The spray-drying apparatus had a diameter of 15 cm, a length of 0.7 meters and a generally hemispherical bottom section. A conduit from the bottom section was connected directly to a cyclone provided with catch-pot in which the solid material was collected. A spray nozzle was located at the top of the apparatus and this was a ¼ JAU Automatic Air Atomizing Nozzle obtained from Spraying Systems Co. of the USA and having a 0.72 mm diameter nozzle.

Spraying was effected under nitrogen by passing a stream of nitrogen, preheated to a temperature of 145° C., into the spray-drying apparatus at a rate of 190 dm$^3$/minute. Nitrogen at a pressure of about 0.4 kg/cm$^2$ gauge was introduced into the spray nozzle. The suspension obtained in stage (B) was fed from the 2 dm$^3$ three-necked glass flask to the spray nozzle by the application of an excess nitrogen pressure of 0.04 kg/cm$^2$ to this flask.

(D) Contacting with titanium tetrachloride

A sample (39 grammes) of the spray dried product from stage (C) was transferred to a 800 cm$^3$ jacketted glass vessel which was provided with a stirrer. 390 cm$^3$ of titanium tetrachloride were added to the vessel, the stirrer was started and heating was applied to the jacket. Heating was continued until a temperature of 100° C., was attained. The temperature was maintained at 100° C., and stirring was continued, for three hours. At the end of three hours, the stirrer was stopped and the solid was allowed to settle whilst continuing to heat the contents of the vessel. 50 minutes after terminating the stirring, the supernatant liquid was siphoned off from the settled solid. The heating was switched off and the contents of the vessel allowed to cool by standing overnight.

(E) Washing

To the residue remaining from stage (D) were added 450 cm$^3$ of the aliphatic hydrocarbon at ambient temperature. The mixture was stirred and heated up to a temperature of 100° C. Stirring at 100° C. was continued for an hour and then ceased. After a further 75 minutes, the supernatant liquid was siphoned off from the settled solid whilst still heating. The heating was switched off and 450 cm$^3$ of the aliphatic hydrocarbon at ambient temperature were added to the hot residue. The mixture was stirred without heating for 15 minutes, then the stirrer was switched off and the solid allowed to settle. After one hour, the supernatant liquid was siphoned off from the settled solid. This washing procedure was repeated twice more.

The cold residue remaining from the fourth washing step was diluted with the aliphatic hydrocarbon to give a final volume of 39. cm$^3$ and the mixture was transferred to a storage vessel under nitrogen.

EXAMPLE 10

(A) Milling magnesium chloride and ethyl benzoate

A Siebtechnik SM50 Vibromill having a total volume of about 165 dm$^3$ and containing 570 kg of steel balls of 25 mm diameter was purged thoroughly with nitrogen to give a nitrogen atmosphere in the mill. 16 kilogrammes of anhydrous magnesium chloride (as used in Example 1) were introduced into the mill which was cooled to −10° C. by passing a mixture of water and ethylene glycol at about −20° C. through the jacket of the mill.

Once the desired temperature had been achieved, the mill was vibrated using a frequency of 1500 oscillations per minute and an amplitude of 2 mm, whilst continuing to pass the mixture of water and ethylene glycol at −20° C. through the jacket of the mill.

4 dm$^3$ of ethyl benzoate was added to the vibrating mill over a period of 2.25 hours, during which time the temperature rose to about 20° C. Milling was continued, whilst still cooling the mill, for a total milling time of 24 hours. The molar ratio of magnesium chloride to ethyl benzoate in the mill was about 6 to 1.

(B) Milling with toluene

Without removing the milled magnesium chloride-ethyl benzoate product of stage (A), 25 dm$^3$ of toluene and 4 dm$^3$ of a 10% weight/volume solution of polystyrene in toluene (as used in stage B) of Example (9) were added to the vibrating mill. Milling was continued, whilst cooling, for a further 30 minutes and the magnesium chloride suspension produced was transferred, under nitrogen, into a drum of capacity 100 dm$^3$. 25 dm$^3$ of toluene were added to the mill, milling was effected for 20 minutes and the liquid, together with any residual magnesium chloride, was transferred to the drum.

(C) Spray drying milled solid/toluene mixture

The contents of the drum obtained as described in stage (B), were spray dried using spray-drying apparatus essentially as described with reference to FIG. 1. The spray-drying vessel had a diameter of 2.2 m, a cylindrical height of 1.95 m and a 60° cone.

The circulating gas was nitrogen which was pre-heated to about 140° C. before entering the spray-drying vessel. The rate of supply of nitrogen was about 650 kg per hour.

The suspension was not pre-heated and hence was at ambient temperature on being fed to the spray-drying vessel.

The rate of rotation of the atomizer disc was 18000 rpm and the time during which the suspension was fed to the spray-drying vessel was 20 minutes.

(D) Contacting with thionyl chloride

A smaple (16 grammes) of the spray dried product from stage (C) was transferred to a 800 cm$^3$ jacketted glass vessel which was provided with a stirrer. 160 cm$^3$ of the aliphatic hydrocarbon and 0.4 cm$^3$ of thionyl chloride were added to the vessel, the stirrer was started and heating was applied to the jacket. Heating was continued until a temperature of 50° C. was attained. The temperature was maintained at 50° C., and stirring was continued, for one hour. At the end of one hour, the stirrer was stopped and the solid was allowed to settle whilst continuing to heat the contents of the vessel. Ten minutes after terminating the stirring, the supernatant liquid was siphoned off from the settled solid.

(E) Contacting with titanium tetrachloride

To the hot residue from stage (D) were added 160 cm$^3$ heating was applied to the jacket. Heating was continued until a temperature of 100° C. was attained. The temperature was maintained at 100° C., and stirring was continued, for three hours. At the end of three hours, the stirrer was stopped and the solid was allowed to settle whilst continuing to heat the contents of the vessel. 40 minutes after terminating the stirring, the supernatant liquid was shiphoned off from the settled solid. The heating was switched off and the contents of the vessel allowed to cool by standing overnight.

The treatment with titanium tetrachloride was repeated with the exception that the solid was allowed to settle for 45 minutes before the supernatant liquid was siphoned off and the residue was not allowed to cool.

(F) Washing

To the hot residue remaining from stage (E) were added 200 cm$^3$ of the aliphatic hydrocarbon at ambient temperature. The mixture was stirred and heating was continued to raise the temperature to 100° C. Stirring at 100° C. was continued for an hour and then ceased. After a further 25 minutes, the supernatant liquid was siphoned off from the settled solid whilst still heating. The heating was switched off and 200 cm$^3$ of the aliphatic hydrocarbon at ambient temperature were added to the hot residue. The mixture was stirred without heating for 10 minutes, then the stirrer was switched off and the solid allowed to settle. After one hour, the supernatant liquid was siphoned off from the settled solid. This washing procedure was repeated twice more.

The cold residue remaining from the fourth washing step was diluted with the aliphatic hydrocarbon to give a final volume of 160 cm$^3$ and the mixture was transferred to a storage vessel under nitrogen.

COMPARATIVE EXAMPLE D

The spray dried product of stage (C) of Example 10 was used and was subsequently treated in a similar manner to that described for stages (D) and (E) of Example 9. This material was not contacted with thionyl chloride.

(D) Contacting with titanium tetrachloride

The procedure of stage (D) of Example 9 was repeated using 27 grammes of the spray dried product of stage (C) of Example 10 and 270 cm$^3$ of titanium tetrachloride. The solid was allowed to settle for 15 minutes and the supernatant liquid was siphoned off but the residue was not allowed to cool.

(E) Washing

The procedure was essentially as described in stage (E) of Example 9 with the exception that the hot residue from stage (D) was used and 300 cm$^3$ of the aliphatic hydrocarbon were used for each wash. After the second wash, the solid was allowed to cool and settle for about 65 hours.

After the fourth wash, the residue was diluted to a volume of 270 cm$^3$.

EXAMPLE 11

A sample of the spray dried product of stage (C) of Example 10 was treated as generally described in stages (D), (E) and (F) for Example 10, but on a larger scale.

(D) Contacting with thionyl chloride

This was effected in a vessel of 6 dm$^3$ capacity. 500 grammes of the spray dried product of stage (C) of Example 10, 5 dm$^3$ of the aliphatic hydrocarbon and 13 cm$^3$ of thionyl chloride were used. The supernatant liquid was siphoned off 80 minutes after terminating the stirring.

(E) Contacting with titanium tetrachloride

This was effected in the same vessel as stage (D), using 3 dm$^3$ of titanium tetrachloride for each contacting and maintaining the temperature of 100° C. for two hours. After the first contacting the solid was allowed to settle for one hour and after the second (F) Washing p To the hot residue from stage (E) were added 5.5 dm$^3$ of the aliphatic hydrocarbon and the mixture was allowed to stand, without heating, for 18 hours. The mixture was then stirred and heated to 100° C., maintained at 100° C. for one hour, allowed to settle for 10 minutes and the supernatant liquid was siphoned off. Heating was stopped and the three subsequent washes were effected using 5.5 dm$^3$ of the aliphatic hydrocarbon for each wash. The residue was finally diluted to a total volume of 4.5 dm$^3$.

COMPARATIVE EXAMPLE E

The procedure was similar to that of Example 11 with the exception that stages (D), (E) and (F) were effected using smaller quantities of reagents and omitting thionyl chloride in stage (D).

(D) Contacting with the aliphatic hydrocarbon 200 grammes of the spray dried product of stage (C) of Example 10 and 2 dm$^3$ of the aliphatic hydrocarbon were used. The supernatant liquid was siphoned off 35 minutes after terminating the stirring.

(E) Contacting with titanium tetrachloride 1.5 dm$^3$ of titanium tetrachloride were used for the first contacting, and the solid was allowed to settle for 1.75 hours. Two dm$^3$ of titanium tetrachloride were added to the residue and the mixture was allowed to stand, without heating, for 18 hours. The mixture was stirred, heated to 100° C., maintained at 100° C. for three hours and allowed to settle for one hour 20 minutes.

(F) Washing

Two dm$^3$ of the aliphatic hydrocarbon were used for each wash. The aliphatic hydrocarbon was added to the hot residue from stage (E) and the temperature was raised to 100° C. After an hour at 100° C., the solid was allowed to settle for 40 minutes. The subsequent three washes were effected without heating and the residue was diluted to a total volume of 2 dm$^3$.

EXAMPLE 12

The procedure was similar to that of Example 11 with the exception that stages (D), (E) and (F) were effected using smaller quantities of reagents and only one contacting step in stage (E).

(D) Contacting with thionyl chloride 200 grammes of the spray dried product of Example 10, 2 dm$^3$ of the aliphatic hydrocarbon and 5.2 cm$^3$ of thionyl chloride were used.

(E) Contacting with titanium tetrachloride

Two dm$^3$ of the titanium tetrachloride were used for a single contacting at 100° C. for three hours.

(F) Washing

Washing was effected directly after the titanium tetrachloride contacting, using 2 dm$^3$ of the aliphatic hydrocarbon for each wash.

COMPARATIVE EXAMPLE F

The procedure was as described for Example 12 with the exception that stage (D) was omitted.

EXAMPLES 13 to 17

Polymerisation was carried out in an 8 dm$^3$ stainless steel autoclave.

3 dm$^3$ of the aliphatic hydrocarbon were charged into the autoclave and degassed at 70° C. for 15 minutes at a pressure of 0.07 kg/cm$^2$ absolute. Propylene was then admitted to the vessel in an amount to give a pressure of 1.1 kg/cm² absolute. The aliphatic hydrocarbon was stirred and stirring was continued throughout the following procedures. 40 cm³ of a solution in the aliphatic hydrocarbon containing 20 millimole of aluminium tri-isobutyl were added to the autoclave followed by 40 cm³ of a solution in the aliphatic hydrocarbon containing 7 millimoles of methyl 4-methylbenzoate. 4 cm³ of a suspension of a titanium halide composition, obtained in one of Examples 9 to 12 or Comparative Examples D, E and F, were then added as a suspension.

The autoclave was maintained at 70° C. while propylene was passed into the autoclave to achieve a pressure of 11.5 kg/cm² absolute. 10 millimoles of hydrogen were then added. The pressure was maintained at 11.5 kg/cm² absolute by feeding propylene. 10 millimole quantities of hydrogen were added to the autoclave 0.5 and 1.0 hours after pressurising to 11.5 kg/cm² absolute. After 2 hours, the propylene feed was terminated and the autoclave was vented to atmospheric pressure. The polymer suspension was passed into a receptacle and the polymer was filtered off in air. A sample of the polymer was dried at 100° C. in a fluidised bed using nitrogen as the fluidising gas. Some properties of the polymers obtained are given in Table Three.

TABLE THREE

| Example or Comp Example | Ti Compn Type (j) | Polymer Properties | | | | | |
|---|---|---|---|---|---|---|---|
| | | MFI (k) | FM (f) | Ti (h) | Al (h) | Cl (h) | PD (g/l) (l) |
| 13 | 9 | 21.0 | 1.50 | 7 | 152 | 196 | 421 |
| 14 | 10 | 37.3 | 1.53 | 6 | 152 | 210 | 408 |
| G | D | ND | 1.40 | 7 | 155 | ND | 408 |
| 15 | 11 | 31.5 | 1.42 | 8 | 134 | 177 | 408 |
| 16 | 11 | ND | 1.48 | 6 | 99 | 195 | 413 |
| 17 | 12 | 25.9 | 1.52 | 6 | 171 | 205 | 417 |
| H | E | 47.7 | 1.52 | 9 | 171 | 193 | 417 |
| I | F | 42.9 | 1.50 | 7 | 159 | 213 | 404 |

Notes to Table Three
(f) and (h) are as defined in notes to Table Two.
(j) Type refers to the Example, or Comparative Example, in which the production of the titanium composition is described.
(k) MFI is the melt flow index measured by ASTM Test Method D 1238/70 at 190° C. using a weight of 10 kg.
(l) PD is the packaging density of the polymer which was determined by introducing 10 grammes of the polymer powder into a 50 cm³ flat-bottomed graduated tube of 2 cm internal diameter. The polymer powder is compacted by striking the base of the tube against a horizontal surface a total of 30 times. The volume occupied by the polymer powder was then determined. Duplicate measurements are made.

For each polymer, a sample of the filtered polymer was washed with 60–80 petroleum ether and dried in a vacuum oven for 4 hours at a pressure of 50 mm of mercury and a temperature of 60° C. The dried polymer was subjected to particle size analysis by sieving and the results are set out in Table Four.

TABLE FOUR

| Particle size (microns) | % Weight Retained | | | | | | | |
|---|---|---|---|---|---|---|---|---|
| | Ex 13 | Ex 14 | Comp D | Ex 15 | Ex 16 | Ex 17 | Comp H | Comp I |
| >850 | 2.9 | 1.6 | 0.5 | 2.5 | 1.2 | 1.2 | 0.9 | 0.8 |
| 850–500 | 17.9 | 28.2 | 18.6 | 39.5 | 33.9 | 30.9 | 21.6 | 22.5 |
| 500–425 | 7.1 | 13.1 | 12.3 | 16.3 | 16.5 | 16.2 | 12.6 | 12.7 |
| 425–300 | 24.4 | 24.8 | 28.5 | 29.1 | 27.6 | 23.1 | 25.1 | 15.7 |
| 300–212 | 9.9 | 13.0 | 14.0 | 9.4 | 13.2 | 13.4 | 12.7 | 13.5 |
| 212–125 | 11.4 | 11.1 | 13.5 | 2.9 | 4.9 | 8.2 | 12.1 | 12.5 |
| 125–75 | 11.9 | 5.4 | 9.9 | 0.8 | 1.0 | 2.1 | 8.0 | 7.5 |
| <75 | 23.2 | 3.3 | 7.5 | 0.1 | 0.3 | 0.4 | 9.0 | 5.5 |

From Table Four, it will be observed that those material which were contacted with thionyl chloride after spray drying contained a lower proportion of fine polymer.

EXAMPLE 18

(A) Milling magnesium chloride, thionyl chloride and ethyl benzoate

Milling was carried out in a vibration mill as described in stage (A) of Example 10. The magnesium chloride was anhydrous magnesium chloride obtained from Steetley Chemicals Trading Division, of Basing View, Basingstoke, Hampshire, England, and subsequently ground through a sieve plate of 6 mm mesh. The mill was purged with nitrogen as in Example 10 and was vibrated without being cooled. 16 kg of the magnesium chloride were introduced into the vibrating mill followed by 500 cm³ of thionyl chloride. Milling was effected for 2.5 hours whilst controlling the temperature at a maximum of 50° C. by the intermittent supply of a water-ethylene glycol coolant mixture at −20° C. through the jacket of the mill. Vibration and cooling were then terminated and the mill was allowed to stand for 16 hours.

The mill was cooled to about 5° C. by the passage of the coolant through the jacket of the mill and 8 dm³ of ethyl benzoate were added slowly over a period of about one hour. The mill was then vibrated for 24 hours whilst cooling and the milled product was then removed from the mill and stored under nitrogen.

(B) Contacting with titanium tetrachloride 15 kg of the milled product from stage (A) was transferred to a jacketted 200 dm³ steel reactor which was provided with a stirrer. 100 dm³ of titanium tetrachloride were added to the reactor, the stirrer was started and heating was applied to the jacket. Heating was continued until a temperature of 100° C. was attained. The temperature was maintained at 100° C., and stirring was continued, for three hours. At the end of the three hours, the stirrer was stopped, and the solid was allowed to settle whilst continuing to heat the contents of the vessel. Two hours after terminating the stirring, the supernatant liquid was siphoned off from the settled solid. The settled solid was allowed to stand over a period of 4.5 hours whilst maintaining the temperature at 100° C.

(C) Washing

To the hot residue remaining from stage (B) were added 120 dm³ of the aliphatic hydrocarbon at ambient temperature over a period of 0.5 hours, whilst stirring the mixture. On adding the aliphatic hydrocarbon the temperature fell but, after 40 minutes, the temperature had risen to 100° C. Stirring at 100° C. was continued for one hour and the stirrer was then stopped whilst continuing to heat. After a further two hours, the supernatant liquid was siphoned off from the settled solid.

After 40 minute, 120 dm³ of the aliphatic hydrocarbon at ambient temperature were added to the hot residue from the first washing. The mixture was stirred for 45 minutes whilst heating to a temperature of 100° C. On attaining 100° C., stirring was continued for one hour, the stirrer was switched off and the solid allowed to settle whilst still heating. After two hours, the supernatnat liquid was siphoned off from the settled solid and the heating was switched off.

To the hot residue were added 120 dm³ of the aliphatic hydrocarbon at ambient temperature. The mixture was stirred for 10 minutes without heating, stirring was stopped, the solid was allowed to settle for two hours and the supernatant liquid was siphoned off from the settled solid. This washing procedure was then repeated once more.

The residue was finally washed once using 80 dm³ of toluene, the procedure otherwise being similar to that used for the previous two washing steps.

(D) Dispersion of titanium-containing composition

The procedure of stage (A), (B) and (C) was repeated and the products of both of these repeated procedures were mixed in a 200 dm³ steel vessel fitted with a stirrer.

To the mixed products, which were being stirred, were added 5 dm³ of a 10% weight/volume solution of polystyrene (Lustrex HF 66 - available from Monsanto Limited) in toluene. The mixture was stirred for a further 0.5 hour.

The mixture was then dispersed by being repeatedly circulated through a circulating loop connected to the 200 dm³ steel vessel, the circulating loop including a 275L Silverson high shear mixer available from Silverson Machines Limited, of Chesham, Buckinghamshire, England. After circulating the mixture for a period of two hours, the dispersion produced was transferred into a nitrogen purged, stainless steel drum having a capacity of 100 dm³. The mixture, which was stored under nitrogen, had a solids content of 32% weight/weight relative to the mixture and the polystyrene content was 2% weight/weight relative to the titanium-containing solid.

(E) Spray drying titanium-containing dispersion

Spray drying of the product of stage (D) was effected using the apparatus as used in stage (C) of Example 10. Nitrogen, which had been pre-heated to 140° C., was supplied at a flow rate of 700 kg per hour. The dispersion was passed to the apparatus at a rate of 135 kg/hour. The rate of rotation of the atomizer disc was 18000 rpm. The spray-dried solid was free-flowing and had a mean particle size of $40 \times 10^{-6}$ m.

The spray-dried solid was suspended in the aliphatic hydrocarbon.

EXAMPLE 19 to 22

The product of Example 18 was used to effect continuous propylene polymerisation in the gas phase using a procedure generally as described for Examples 7 and 8.

Polymerisation was effected in a 0.8 m³ stainless steel autoclave fitted with a stirrer and having a heating jacket. The autoclave was charged with 90 kilogrammes of dry, dechlorinated, polypropylene powder obtained from a previous run using a similar type of catalyst. Heating was applied to the heating jacket and the contents of the reactor were stirred. When a temperature of about 70° C. had been attained, nitrogen was introduced into the autoclave to give a pressure of 5 bar absolute and the excess pressure was released to give a pressure of one bar absolute. This procedure was effected a total of five times. The procedure was then repeated, five times, using liquid propylene in place of nitrogen.

Liquid propylene was then added to raise the pressure to the desired operating pressure of 28 bar gauge. Hydrogen was added separately in the proportion of 1.5% by volume relative to the propylene.

A 1.5 M solution of tri-isobutyl aluminium in the aliphatic hydrocarbon and a 0.6 M solution of methyl 4-methylbenzoate in the aliphatic hydrocarbon were added separately in amounts to give the desired relative molar proportions of the two materials, the ester solution being added at a rate of 155 cm³/hour. A suspension containing the produce of Example 18, and having a solids content of about 50% by weight, was also introduced into the autoclave.

Once polymerisatin had commenced, the temperature and pressure were maintained at 73° C. and 28 bar gauge. Once polymerisation had commenced, the propylene removed from the autoclave was passed through a recycle loop containing a cooling system and returned to the autoclave. A further quantity of fresh liquid propylene was added to the autoclave to make up for propylene removed as polymer, or with the polymer. The temperature and pressure within the autoclave were controlled by the rate of addition of the liquid propylene (recycled and fresh). The product of Example 18 was added at a rate sufficient to maintain the polymer production at a desired rate of 45 kg/hour.

Further details of the polymerisation conditions, and some properties of the products obtained, are set out in Table Five.

TABLE FIVE

| Example | Ratio TBA/ MT (m) | Time (hours) (d) | Polymer properties | | | |
|---|---|---|---|---|---|---|
| | | | MFI (e) | FM (f) | Ti (h) | HHS (i) |
| 19 | 2.7 | 12 | 2.2 | 1.51 | 8 | 4.5 |
| 20 | 2.7 | 28 | 3.0 | 1.42 | 8 | 4.3 |
| 21 | 2.5 | 12 | 1.6 | 1.46 | 8 | 3.8 |
| 22 | 2.5 | 28 | 1.7 | 1.51 | 8 | 3.4 |

Notes to Table Five
(d), (e), (f), (h) and (i) are all as defined in Notes to Table Two.
(m) TBA/MT is the molar ratio of tri-isobutyl aluminium (TBA) to methyl-4-methylbenzoate (MT).

A polymer product which had been removed from the autoclave after 20 hours, but otherwise using the polymerisation conditions as used for Examples 19 and 20, was subjected to particle size analysis by sieving and the results are set out in Table Six.

TABLE SIX

| Particle Size (microns) | % Weight Retained |
|---|---|
| >850 | 11.4 |
| 850–500 | 29.8 |
| 500–425 | 9.7 |
| 425–300 | 18.9 |
| 300–212 | 11.7 |
| 212–125 | 10.8 |
| 125–75 | 4.9 |
| <75 | 2.7 |

EXAMPLE 23

Into a stainless steel mill of 15.2 cm in length and 7.9 cm in diameter, and fitted internally with four metal strips, were introduced 200 stainless steel balls of 12.7 mm diameter and 200 stainless steel balls of 6.35 mm diameter. The mill was sealed and purged by passing a flow of nitrogen through the mill for a period of one hour. 20.1 grammes of anhydrous magnesium chloride (BDH technical grade) were introduced into the mill, followed immediately by one cm³ of thionyl chloride. When these additives had been introduced into the mill it was rotated at 120 rpm for four hours. No heating or cooling was applied to the mill.

After milling for four hours, 3.23 grammes of an equimolar complex of ethyl benzoate and titanium tetrachloride were introduced into the mill as a crystalline solid. Milling was then continued for a further 24 hours. Rotation of the mill was stopped and the milled product was suspended in a 300 cm³ of heptane and removed from the mill.

EXAMPLES 25 TO 27

The product of Example 3 was used to polymerise propylene using a procedure similar to that described for Example 24 with the following exceptions.

The catalyst system consisted only of the product of Example 3 and a trialkyl aluminium compound. No ester compound, or other Lewis Base compound, was added to the polymerisation flask. The amount of the product of Example 3, and of the trialkyl aluminium compound, which were used are given in Table Seven. Details of the amount of polymer formed, and the proportion of soluble polymer, are also given in Table Seven.

TABLE SEVEN

| Example | Ti compn. amount (mM) | Al Compound Type (n) | Amount (mM) (o) | Polymer Yield (p) | Wt % Diluent Soluble Polymer (q) | HHS (i) (r) | I.I (s) |
|---|---|---|---|---|---|---|---|
| 25 | 0.0452 | TBA | 10 | 90.8 | 23. | 15.4 | 61.6 |
| 26 | 0.0906 | TEA | 2.5 | 92 | 12.1 | 10.6 | 77.3 |
| 27 | 0.0906 | TBA | 2.5* | 96.4 | 7.1 | 6.5 | 86.4 |

Notes to Table Seven
(i) is as defined in Notes to Table Two.
(n) TBA is tri-isobutyl aluminium. TEA is triethyl aluminium.
(o) *Initially only 1 millimole of TBA was added, but since the polymerisation rate was low, a further 1.5 millimole of TBA was added after 10 minutes polymerisation.
(p) Polymer yield is given in grammes of total polymer (solid + diluent soluble) formed.
(q) Given by the relationship $$\frac{(Wt \text{ of diluent soluble polymer}) \times 100}{Wt \text{ of total polymer}}$$

(r) This is determined using the solid polymer in the Soxhlet extration and expressed as a % by weight of the total polymer (solid + diluent soluble) formed
(s) I.I is isotactic index and is given by the relationship:
100 − (Wt % diluent soluble polymer + HHS).

EXAMPLE 24

The product of Example 23 was used to polymerise propylene.

A two dm³ polymerisation flask equipped with an efficient stirrer and a water jacket was dried carefully and one dm³ of the aliphatic hydrocarbon was introduced. The diluent was evacuated at 60° C. and purged with nitrogen, this procedure being effected a total of four times, which treatment effectively reduced the water and oxygen contents of the diluent to below 10 ppm by weight. The diluent was then saturated with the purified propylene to one atmosphere pressure, the mixture was stirred and stirring was continued throughout the following stages. Nine millimoles of tri-isobutyl-aluminium were introduced as a one molar solution in the aliphatic hydrocarbon followed by three millimoles of methyl-4-methylbenzoate as a 0.5 molar solution in the aliphatic hydrocarbon. After five minutes, 5 cm³ of the suspension obtained as described in Example 23 were introduced. The pressure in the reaction vessel was maintained at one atmosphere by supply of propylene from a cylinder. After a period of two hours from the introduction of the product of Example 23, the run was terminated by removing the propylene and passing nitrogen into the reaction vessel. A sample of supernatant liquid was extracted for determining the concentration of soluble polymer dissolved in the polymerisation diluent. The solid was filtered and washed three times with petrol ether and dried in a vacuum oven at 120° C. for an hour.

21.1 grammes of solid polymer were obtained and the amount of polymer dissolved in the polymerisation diluent was found to be 0.55 grammes.

EXAMPLE 28

(A) Milling magnesium chloride, thionyl chloride, di-isobutyl phthalate and titanium tetrachloride Milling was carried out in a chamber of an Sm 6 Vibromill, which is described in more detail in stage (A) of Example 1.

151 grammes of essentially anhydrous magnesium chloride (obtained from Norsk Hydro and containing about 2% by weight of water) and 17 cm³ of thionyl chloride were added to the mill chamber and milling was then effected, without cooling, for 16 hours using the milling conditions as described in stage (A) of Example 1. Milling was terminated and the mill allowed to stand for about 70 hours.

60 cm³ of di-isobutylphthalate were then added to the mill and milling was effected for 24 hours whilst passing water at ambient temperature through the jacket of the mill chamber.

Titanium tetrachloride was added to the mill chamber in an amount which was equimolar relative to the di-isobutylphthalate and milling was continued under the same conditions for a further 24 hours.

At the completion of milling, the product formed was removed by inverting the mill chamber and vibrating for a further 1.5 hours.

The molar proportions of magnesium chloride, di-isobutylphthalate and titanium tetrachloride added to the mill chamber were 7:1:1.

(B) Washing 102.6 grammes of the product of stage (A) were placed in a 1.2 dm³ jacketted glass reaction vessel having a glass frit base and fitted with a stirrer. 1,2-dichloroethane was added to the reaction vessel to give a total volume of one dm³. The mixture was stirred and heated up to 80° C. Stirring at 80° C. was continued for two hours and was then stopped, the liquid was filtered off and heating was terminated.

The residual solid was then washed five times using an isoparaffin fraction essentially all of which has a boiling point in the range 117° C. to 135° C. (hereafter referred to as the "isoparaffin fraction"). Each washing was effected by adding sufficient of the isoparaffin fraction, at ambient temperature, to give a total volume of one dm$^3$, stirring the mixture for 15 minutes and then filtering off the liquid.

The solid was finally suspended in sufficient of the isoparaffin fraction to give a total volume of 0.8 dm$^3$.

By analysis, the final suspension was deduced to be 0.0305 Molar relative to titanium.

EXAMPLES 29 TO 31

The product of Example 28 was used to effect polymerisation in the gas phase using a procedure similar to that described for Examples 7 and 8 with the exception that the reaction vessel initially contained 3.5 kg of polypropylene powder.

After polymerisation had been commenced using a catalyst system of the type used in Examples 7 and 8, the catalyst system was changed to the product of Example 28 and a mixture, in the aliphatic hydrocarbon, of triethyl aluminium and phenyl triethoxysilane in the molar ratio of 10:1, which mixture had been premixed, and stored for at least 12 hours, under nitrogen.

Further details of the polymerisation conditions are set out in Table Eight. Properties of the polymer products removed at various times during the polymerisation are set out in Table Nine. The initial hydrogen proportion (1.5% by weight relative to the propylene) was varied in an attempt to maintain the MFI in the range 2 to 4 but control of MFI proved to be difficult with this particular catalyst system.

TABLE EIGHT

| Example | Ti Compn. Amount (mM/h) | TEA Amount (mM/h) (n) | DT (hours) (c) |
|---|---|---|---|
| 29 | 0.31 | 21 | 1.2 |
| 30 | 0.14 | 21 | 2.1 |
| 31 | 0.14 | 21 | 2.1 |

Notes to Table Eight
(c) is as defined in Notes to Table Two.
(n) is as defined in Notes to Table Seven.

TABLE NINE

| Example | Time (hours) (d) | MFI (e) | FM (f) | Ti (h) | Al (h) | Cl (h) | HHS % (i) |
|---|---|---|---|---|---|---|---|
| 29 | 8 | 33.4 | 1.78 | 5 | 164 | 169 | 2.9 |
| 30 | 10 | 86.0 | 1.84 | 4 | 173 | 167 | ND |
| 31 | 12 | 27.0 | 1.87 | 4 | 168 | 179 | 2.1 |

Notes to Table Nine
(d), (e), (f), (h) and (i) are all as defined in Notes to Table Two.

EXAMPLE 32

A milling and washing procedure was carried out in a manner similar to that of Example 28, and a sample of the product was spray-dried.

In stage (A), 218 grammes of magnesium chloride and 23 cm$^3$ of thionyl chloride were added to the mill and milling was effected for 21 hours. 40.5 cm$^3$ of di-isobutyl phthalate was immediately added, milling was continued for 24 hours, 16.7 cm$^3$ of titanium tetrachloride was added and milling was continued for a further 24 hours. The molar proportions of magnesium chloride, di-isobutyl phthalate and titanium tetrachloride added to the mill chamber were 15:1:1.

In stage (B), 119.7 grammes of the product of stage (A) was used. The washed solid was finally suspended in toluene to give a final volume of 0.8 dm$^3$.

(C) Spray drying suspension

The suspension of stage (B) was allowed to settle and sufficient of the supernatant liquid was siphoned off to give a residual volume of 350 cm$^3$. To this mixture was added 20 cm$^3$ of the polystyrene in toluene solution used in stage (B) of Example 9.

The mixture obtained was stirred and spray dried using the apparatus and spray drying conditions described for stage (C) of Example 9 with the exception that the nitrogen introduced into the spray nozzle was at 0.5 kg/cm$^2$ gauge and an excess nitrogen pressure of about 0.15 kg/cm$^2$ was applied to the glass flask containing the suspension in toluene.

EXAMPLES 33 TO 36

1.5 dm$^3$ of the aliphatic hydrocarbon were added to a five dm$^3$ stainless steel autoclave and were purged with nitrogen and evacuated at 70° C., this procedure being repeated three times and the autoclave was then evacuated to a pressure of $0.2 \times 10^{-3}$ kg/cm$^2$ whilst stirring vigorously. Stirring was continued and propylene was introduced to raise the pressure to one atmosphere.

A solution, in the aliphatic hydrocarbon, containing 15 millimoles of a trialkyl aluminium compound was added to the autoclave followed by a solution, in the aliphatic hydrocarbon, containing phenyl triethoxysilane. Then a quantity of a 5 to 10% by weight suspension, in the aliphatic hydrocarbon, of the product of Example 32 was added. Propylene was added to the autoclave until a pressure of 7 kg/cm$^2$ gauge was achieved. Polymerisation was continued at 70° C. for 2 hours at 7 kg/cm$^2$ gauge and was then terminated by venting off the excess propylene and exposing the contents of the autoclave to air. Portions of hydrogen were added to the autoclave at the start of polymerisation, and at half hourly intervals thereafter, the hydrogen being added from a burette of 10 cm$^3$ capacity and at a pressure of 18 kg/cm$^2$ gauge, which was vented to the autoclave. At the completion of polymerisation, an aliquot portion of the diluent was taken and the proportion of polymer dissolved in this aliquot was determined by evaporation to dryness. Further details of the polymerisation conditions and the results obtained are given in Table Ten.

TABLE TEN

| Ex | Ti Compn. Amount (cm$^3$) (t) | Al Compd Type (n) | PTES Amount (mM) (u) | Polymer Yield (p) | Wt % Diluent Soluble Polymer (q) | Ti (ppm) (h) | Cl (ppm) (h) |
|---|---|---|---|---|---|---|---|
| 33 | 5 | TBA | 1.5 | 600 | 1.1 | 4 | 250 |

TABLE TEN-continued

| Ex | Ti Compn. Amount (cm³) (t) | Al Compd Type (n) | PTES Amount (mM) (u) | Polymer Yield (p) | Wt % Diluent Soluble Polymer (q) | Ti (ppm) (h) | Cl (ppm) (h) |
|---|---|---|---|---|---|---|---|
| 34 | 3 | TBA | 0.75 | 475 | 1.6 | 3 | 220 |
| 35 | 3 | TEA | 1.5 | 475 | 0.8 | ND | ND |
| 36 | 3 | TEA | 0.75 | 420 | 1.0 | ND | ND |

Notes to Table Ten
(h) is as defined in Notes to Table Two.
(n), (p) and (q) are all as defined in Notes to Table Seven.
(t) The column gives the number of cm³ of the suspension of the titanium composition which was added.
(u) PTES is phenyl triethoxysilane.

EXAMPLE 37

(A) Milling magnesium chloride, thionyl chloride and ethyl benzoate

The milling procedure of stage (A) of Example 3 was repeated. The molar ratio of magnesium chloride to ethyl benzoate in the mill chamber was about 3 to 1.

(B) Contacting with titanium tetrachloride

A sample (495 grammes) of the milled product from stage (A) was transferred to a 6 dm³ jacketted glass vessel which was provided with a stirrer. 4 dm³ of titanium tetrachloride were added to the vessel, the stirrer was started and heating was applied to the jacket. Heating was continued until a temperature of 100° C. was attained. The temperature was maintained at 100° C., and stirring was continued, for four hours. At the end of four hours, the stirrer was stopped, and the solid was allowed to settle whilst continuing to heat the contents of the vessel. Two hours after terminating the stirring, the supernatant liquid was siphoned off from the settled solid. The heating was switched off and the settled solid allowed to cool over a period of 18 hours.

(C) Washing

The residue from stage (B) was stirred and heated to 100° C. The mixture was stirred at 100° C. for 30 minutes and 5 dm³ of the aliphatic hydrocarbon fraction, at ambient temperature, were added slowly, whilst still heating and stirring. The rate of addition of the aliphatic hydrocarbon was such that the temperature of the mixture was not allowed to drop below 60° C. Addition of the aliphatic hydrocarbon was complete after 30 minutes, at which time the temperature was 60° C. Stirring and heating were continued for 15 minutes during which time the temperature rose to 80° C. Stirring was then stopped and the solid was allowed to settle over a period of 1.25 hours whilst the temperature was maintained at 80° C. The supernatant liquid was then siphoned off from the settled solid.

Heating of the residual mixture was continued to maintain the temperature at 80° C., and after 30 minutes a further 5 dm³ of the aliphatic hydrocarbon at ambient temperature were added whilst stirring the mixture. During the addition of the aliphatic hydrocarbon the temperature was not allowed to fall below 60° C. Addition of the aliphatic hydrocarbon was complete after 30 minutes and stirring was continued for a further 15 minutes. Stirring was then stopped and the solid was allowed to settle over a period of 1.75 hours whilst maintaining a temperature of 80° C. The supernatant liquid was siphoned off from the settled solid which was allowed to cool by standing for 18 hours.

To the cold residue were added 5 dm³ of the aliphatic hydrocarbon at ambient temperature. The mixture was stirred for 15 minutes, stirring was stopped, the solid was allowed to settle for 4.75 hours and the supernatant liquid was siphoned off from the settled solid. This cold washing procedure was then repeated once more with the exception that the solid was allowed to settle for 18 hours.

The cold residue was finally diluted to give 1.5 dm³ of suspension by the addition of the aliphatic hydrocarbon at ambient temperature and the whole mixture was transferred to a 2 dm³ storage vessel under nitrogen.

COMPARATIVE EXAMPLE J

The procedure was similar to that described for Example 1 with the major difference that the thionylchloride was replaced by phosphorus oxytrichloride ($POCl_3$).

In stage (A), 190 grammes of essentially anhydrous magnesium chloride from Norsk Hydro and 8 cm³ of phosphorus oxytrichloride were used. Milling was effected for 8 hours without cooling and 95 cm³ of ethyl benzoate were then added. Milling with cooling, was continued for a further 24 hours.

In stage (B), only one contacting step with titanium tetrachloride was used. The contacting was effected using 151 grammes of the milled product from stage (A) and 4 dm³ of titanium tetrachloride. The solid was allowed to settle for 2.5 hours and to cool overnight.

In stage (C), washing was effected using 5 dm³ of the heptane fraction for each washing stage.

By analysis, the solid product had a titanium content of 1.8% by weight.

EXAMPLES 38 TO 44

Propylene was polymerised continuously in the gas phase using a procedure similar to that described for Example 8 with the exception that the reaction vessel contained about 4 kg of polypropylene powder.

Solutions of tri-isobutyl aluminium and methyl 4-methylbenzoate in the aliphatic hydrocarbon were separately fed to a "T" piece in the molar proportions of 2.5:1 and the mixture was then passed immediately to the autoclave. A suspension containing the titanium composition obtained by the process of Example 37 or Comparative Example J was also introduced into the autoclave. Polymerisation conditions were altered by changing the titanium composition, the rate of feeding of the various catalyst components and the dwell time.

During the polymerisation, polypropylene, saturated with propylene, was intermittently withdrawn from the autoclave at a desired rate to maintain a constant polymer bed level in the autoclave and corresponding to an average residence time in the range 1.0 up to 2.2 hours. The temperature and pressure were maintained at 70° C. and 2.7 MN/m² absolute respectively. The aluminium compound, the ester and the suspension of the titanium compositions were continuously introduced into the autoclave at the rates set out in Table Eleven hereafter.

The rate of adding the suspension of the titanium composition was adjusted to attain a desired rate of polymer production.

Further details of the polymerisation conditions are set out in Table Eleven. Properties of the polymer products removed at various times during the polymerisations are set out in Table Twelve.

TABLE ELEVEN

| Example or Comp Example (v) | Ti Compositon Type (b) | Ti Compositon Amount (mM/H) | TBA Amount (mM/h) | MT Amount (mM/h) | DT (hours) (c) |
|---|---|---|---|---|---|
| 38 | 37 | 0.33 | 20 | 8 | 1.7 |
| 39 | 37 | 0.45 | 20 | 8 | 1.5 |
| 40 | 37 | 0.23 | 20 | 8 | 2.2 |
| 41 | 37 | 0.39 | 22.5 | 9 | 1.2 |
| 42 | 37 | 0.25 | 22.5 | 9 | 1.5 |
| 43 | 37 | 0.25 | 22.5 | 9 | 1.8 |
| 44 | 37 | 0.26 | 22.5 | 9 | 1.4 |
| K* | J | 0.8 | 21 | 8.4 | 1.1 |
| L* | J | 0.6 | 21 | 8.4 | 1.4 |
| M* | J | 1.0 | 21 | 8.4 | 1.0 |

Notes to Table Eleven
(b) and (c) are as defined in Notes to Table One.
(v) *In these comparative examples the reaction vessel contained about 3.5 kg of polypropylene powder.

TABLE TWELVE

| | | Polymer properties | | | | | |
|---|---|---|---|---|---|---|---|
| Example | Time (hours) (d) | MFI (e) | FM (f) | Ti (h) | Al (h) | Cl (h) | HHS (%) (i) |
| 38 | 16 | 3.1 | 1.52 | 7 | 166 | 195 | 4.0 |
| 39 | 18 | 2.4 | 1.44 | 8 | 151 | 154 | 4.1 |
| 40 | 20 | 1.2 | 1.52 | 6 | 220 | 223 | 3.9 |
| 41 | 9 | 1.3 | 1.70 | 6 | 166 | 207 | 3.6 |
| 42 | 13 | 2.5 | 1.52 | 5 | 215 | 183 | ND |
| 43 | 15 | 1.2 | 1.52 | 6 | 220 | 223 | 3.9 |
| 44 | 17 | 1.9 | 1.56 | 5 | 149 | 174 | ND |
| K | 10 | 2.1 | 1.48 | 12 | 152 | 380 | 3.7 |
| L | 12 | 3.4 | 1.52 | 11 | 167 | 460 | 3.9 |
| M | 14 | 2.9 | 1.51 | 13 | 159 | 400 | 3.6 |

Notes to Table Twelve
(d), (e), (f), (h) and (i) are all as defined in Notes to Table Two.

I claim:

1. A process for the production of a titanium containing composition which process comprises grinding at a temperature which does not exceed 100° C., a magnesium halide, with at least one compound of the formula $$AO_aX_{(b-2a)}$$

and a Lewis Base compound and, during or subsequent to such grinding, contacting titanium tetrachloride, or a titanium tetrachloride-containing material, with the materials being ground or the product of grinding wherein A is a carbon or sulphur atom;
X is a halogen atom;
a has a valve of 1 or 2 and 2a has a value which is less than the valency of A;
and
b is equal to the valency of A.

2. A process for the production of a titanium containing composition which comprises forming a suspension of a magnesium halide in an inert liquid medium, spray drying the suspension formed, collecting a spray-dried material and contacting the spray-dried material, in turn, with a liquid medium which contains at least one compound of the formula $$AO_aX_{(b-2a)}$$

and with a liquid medium which is, or which contains, titanium tetrachloride, wherein A is a carbon or sulphur atom;
X is a halogen atom;
a has a value of 1 or 2 and 2a has a value which is less than the valency of A; and b is equal to the valency of A.

3. The process of claim 2 wherein the magnesium halide used to form the suspension is the product obtained by grinding a magnesium halide with a Lewis Base compound.

4. The process of claim 1 wherein from 1 up to 25% by weight of the compound $$AO_aX_{(b-2a)}$$

is used relative to the magnesium halide.

5. The process of claim 1 wherein the compound $$AO_aX_{(b-2a)}$$

is thionyl chloride.

6. The process of claim 1 wherein the Lewis Base compound is a mono- or poly-ester of a saturated or unsaturated di- or poly-carboxylic acid, or an ester of the formula $$R^1COOR^2$$

wherein
$R^1$ is a hydrocarbon radical which may be substituted with one or more halogen atoms and/or oxyhydrocarbon groups; and
$R^2$ is a hydrocarbon radical which may be substituted by one or more halogen atoms.

7. The process of claim 1 wherein the grinding with the Lewis Base compound is effected before the contacting with titanium tetrachloride or a titanium tetrachloride-containing material.

8. The process of claim 1 wherein the contacting with titanium tetrachloride is effected by suspending the product of grinding in a liquid phase which contains at least 45% by weight of titanium tetrachloride at an elevated temperature which is at least 60° C. up to the boiling temperature of the liquid phase.

9. The process of claim 1 which includes a spray-drying stage in which a solid material is suspended in an inert liquid medium, the suspension formed is spray-dried and a spray-dried solid material is collected wherein the solid material is a magnesium halide or the product obtained in a subsequent stage, including the last stage.

10. A polymerisation catalyst which is the product obtained by mixing together
(1) a transition metal composition whenever obtained by the process of claim 1; and
(2) an organic compound of aluminium or of a metal of Group IIA of the Periodic Table or a complex of an organic compound of a metal of Group IA or Group IIA of the Periodic Table together with an organic aluminium compound.

11. The catalyst of claim 10 wherein Component (2) is an aluminium trihydrocarbyl compound and the catalyst also includes a Lewis Base compound.

* * * * *